United States Patent [19]
Jones

[11] Patent Number: 5,470,596
[45] Date of Patent: Nov. 28, 1995

[54] FOOD PRODUCT FORMING APPARATUS AND METHOD

[75] Inventor: James E. Jones, Golden, Colo.

[73] Assignee: PRC, Englewood, Colo.

[21] Appl. No.: 114,960

[22] Filed: Sep. 1, 1993

Related U.S. Application Data

[63] Continuation-in-part of Ser. No. 884,646, May 15, 1992, Pat. No. 5,250,314.

[51] Int. Cl.$^6$ .................... A23P 1/00; A22C 7/00
[52] U.S. Cl. .................... 426/512; 425/259; 425/348 R; 425/398; 425/444; 425/546; 426/513
[58] Field of Search .................... 426/512, 513; 425/112, 259, 348 R, 398, 436 R, 440, 444, 447, 546, 572, 318, 412, 351, 422; 452/174; 264/299; 99/485, 450.8

[56] References Cited

U.S. PATENT DOCUMENTS

| | | | |
|---|---|---|---|
| 2,981,973 | 5/1961 | Elmore | 426/513 |
| 3,633,245 | 1/1972 | Partos | 425/348 R |
| 3,728,136 | 4/1973 | Langlands | 426/513 |
| 3,820,449 | 6/1974 | Oickle | 99/485 |
| 3,851,355 | 12/1974 | Hughes | 425/572 |
| 3,913,175 | 10/1975 | Peterson | 426/513 |
| 4,057,874 | 11/1977 | Walker, Jr. | 99/450.8 |
| 4,097,961 | 7/1978 | Richards | 425/572 |
| 4,276,318 | 6/1981 | Orlowski et al. | 426/513 |
| 4,719,116 | 1/1988 | Crevasse | 426/315 |
| 4,872,241 | 10/1989 | Lindee | 426/513 |
| 5,074,778 | 12/1991 | Betts, Jr. et al. | 425/394 |
| 5,250,314 | 10/1993 | Jones | 426/512 |

*Primary Examiner*—George Yeung
*Attorney, Agent, or Firm*—Sheridan Ross & McIntosh

[57] ABSTRACT

A method and apparatus for forming a food product and ejecting the food product onto an appropriate discharge area. One embodiment includes a mold with a three-dimensional mold face. A membrane is mounted on the mold and extends over the mold face such that raw food material directed toward the mold substantially conforms the membrane to the mold face to define a three-dimensional contour for the upper surface of the food product. A plunger assembly which includes a plurality of plungers is thereafter advanced to extend through the mold face to force the membrane away from the mold face and thereby eject the food product from the mold. During ejection the three-dimensional contour of the upper surface of the food product and the substantially planar contour of the lower surface of the food product are substantially reversed. Consequently, a separator may be passed between the membrane and upper surface of the food product.

21 Claims, 17 Drawing Sheets

FOOD PRODUCT FORMING APPARATUS AND METHOD

RELATED APPLICATION

This application is a continuation-in-part of U.S. patent application Ser. No. 07/884,646 by Jones, filed May 15, 1992, now U.S. Pat. No. 5,250,314 issued Oct. 5, 1993, and entitled "THREE DIMENSIONAL FOOD PRODUCT FORMING APPARATUS AND METHOD".

FIELD OF THE INVENTION

The present invention generally relates to the field of food product forming apparatus and methods and, more particularly, to an apparatus and method for forming a food product from a raw food material, including those which have at least one three-dimensional surface, and which effectively ejects such formed product onto an appropriate product discharge area.

BACKGROUND OF THE INVENTION

Numerous machines are utilized in the food industry to transfer, form, and/or package a variety of food products. Specifically with regard to food product forming machines, factors such as production capacity, the consistency of the formed product (e.g., uniform weight), the appearance of the formed product (e.g., relating to the handling thereof, providing a desired end configuration), and waste reduction of raw food materials all have been given consideration in the development efforts relating to such machines. An example of one such machine is commonly referred to in the industry as a patty forming machine which produces, for instance, hamburger patties.

One general type of patty forming machine utilizes a rotatable turret which has a plurality of circumferentially-spaced cylinders for receiving the raw food material (e.g., hamburger) and an infeed manifold, positioned below the turret, for providing the raw food material to a given cylinder when rotated into alignment therewith. Moreover, a piston is reciprocally positioned within each cylinder and is advanced upwardly due to product pressure when the associated cylinder is rotated over the feed station. Consequently, the bottom surface of the piston and the walls of its associated cylinder define the configuration of the formed product. In the case of hamburger patties, the bottom surface of the piston is flat and perpendicular to the sidewalls of the circular cylinder such that the desired disc-shaped product is formed. When the cylinder having the disc-shaped product formed therein is rotated over a deposit area, such as a conveyor belt, the piston is advanced downwardly to eject the formed product from the cylinder. In order to assist in the complete separation of formed product from the face of the piston, the piston typically extends a certain distance below a bottom surface of the turret such that a separation assembly (e.g., a wire or the like) is advanced across the face of the piston to remove product therefrom. As can be appreciated, this type of a separation assembly is suitable in the case where the face of the piston is substantially planar, but would not be effective if the face of the piston has a three-dimensional contour. U.S. Pat. Nos. 3,633,245 to Partos, issued Jan. 11, 1972, and 4,276,318 to Orlowski et al., issued Jun. 30, 1981, are generally representative of this type of patty forming machine.

Another type of patty forming machine generally includes a horizontally reciprocating slide plate having a plurality of cavities extending therethrough. The slide plate is horizontally advanced through a feed station where raw food material is forced down into each cavity through an opening in a plate which covers the upper end of each cavity. This raw food material is forced against a plate which closes the other end of each cavity. Consequently, the configuration of the formed product is determined by the shape of the perimeter of each cavity, which is typically circular, and the configuration of the upper and lower plates, which are typically substantially planar and perpendicular to the sidewalls of the cavity. Once a formed product is contained within each cavity, the slide plate is further horizontally advanced such that a punch, one of which is aligned with each cavity, may be driven downwardly to eject the formed product from the cavities upon an appropriate deposit area. U.S. Pat. No. 4,097,961 to Richards, issued Jul. 4, 1978, is generally representative of this type of patty forming machine.

Another type of patty forming machine generally includes a rotatable wheel having a plurality of spaced cavities positioned on a peripheral surface thereof. A freely reciprocable piston is positioned within each cavity and has an outer surface for contacting product which generally follows the contour of the rotatable wheel. In this regard, a feed station provides a raw food material to each cavity when rotated into alignment therewith which forces the piston upwardly within the cavity. The configuration of the product is thus again defined by the perimeter of each cavity and the face of the piston therein. Notwithstanding the slight, convexly arcuate contour of each piston, the formed product remains substantially a disc-shaped, two dimensional product. As each cavity containing a formed product is rotated over an appropriate deposit area such as a conveyor belt, the piston is urged radially outward such that the formed product is ejected from the cavity. U.S. Pat. No. 3,851,355 to Hughes, issued Dec. 3, 1974, is generally representative of this type of patty forming machine.

Although the above-identified types of patty forming machines are suitable for forming two-dimensional products such as hamburger patties, in certain instances it is desirable for the product formed from a raw food material to assume the configuration of the food product in its "natural state." For instance, in the case where chicken portions are utilized as the raw food material, it may be desirable for such portions to be formed into the shape of, for instance, a chicken breast. Moreover, in the case where fish portions are utilized as the raw food material, it may be desirable for such portions to be formed into the shape of a fillet. U.S. Pat. No. 3,728,136 to Langlands, issued Apr. 17, 1973, generally discloses one type of a product forming machine which accommodates for the formation of at least one type of three-dimensional food product.

Langlands is directed to a process and apparatus for shaping a three-dimensional product in a single forming station. Generally, a rectangular block of frozen fish is positioned on a supporting surface and a die having a three-dimensional configuration is pressed downwardly over the frozen fish to conform such to the shape of the die. In order to assist in the removal of the formed frozen fish product from the die, a sheet of flexible material is positioned across the die cavity prior to engagement with the frozen fish. This flexible material extends between a supply and take-up roll. Consequently, when the die is forced down upon the frozen block of fish, apparently additional flexible material is taken from the supply roll such that the flexible material is able to conform to the contour of the die. In order to eject the product from the die, air may be directed against the flexible material to force it away from the die. Moreover, the flexible material may be moved relative to the die to also eject the formed product from the die. In the latter case, Langlands indicates that the air ejection system need not be used.

Notwithstanding the foregoing, there remains a need for a machine capable of producing a three-dimensional food product from a variety of types of raw food materials in a variety of conditions. Moreover, there remains a need for such a machine which includes a simplified/effective means for ejecting the formed three-dimensional product onto a given deposit area. Furthermore, there remains a need for such a machine which has high production capabilities. Relatedly, there remains a need for such a machine which is able to accurately and consistently eject the formed three-dimensional product onto a predefined portion of a deposit area.

SUMMARY OF THE INVENTION

The present invention is generally a method and apparatus for forming a food product (e.g., three-dimensional) from a raw food material. More particularly, the present invention is particularly directed toward the ejection of the formed food product onto an appropriate discharge area (e.g., product transfer system).

One aspect of the present invention is directed toward the use of a membrane to assist in the ejection of the formed food product from a mold. In this regard, the mold has a mold face which may incorporate a three-dimensional contour and the membrane is positioned over substantially the entire mold face. Moreover, the membrane is mounted directly on the mold. When the mold has a sidewall which defines the periphery of the mold and a mold top which defines an upper surface for the mold, the membrane may be configured to effectively snap onto the mold (e.g., by having a bottom portion which extends across the mold face, a side portion which coincides with the mold sidewall, and a lip portion which extends inwardly from the side portion of the membrane against at least a portion of the mold top). In this case, it may be desirable for the entire sidewall of the mold to be of substantially uniform height. Moreover, when the mold is positioned within a similarly peripherally contoured forming cavity in this case, at least part of the membrane (e.g., the above-described side portion) is positioned between the mold and the forming cavity. Regardless of how the membrane is mounted on the mold, when the raw food material is directed toward the mold face by a raw food material supply assembly, the membrane substantially conforms to the mold face to form the food product. Thereafter, the membrane at least assists in separating the food product from the mold face, and thereby in the ejection of the food product from the mold.

Another aspect of the present invention is directed toward the use of a plunger assembly to assist in the ejection of the formed food product from a mold. The plunger assembly is associated with the mold, includes a plurality of plungers, and is movable between at least first and second positions. In the first position, the plungers are substantially contained within the mold or at least recessed relative to the mold face so as to allow the raw food material directed toward the mold face to conform to the mold face to form the food product. If desired, the mold face may have a three-dimensional contour. After the food product is formed, the plunger assembly is moved relative to the mold such that the plungers extend through and project outwardly from the mold face to at least assist in the ejection of the food product from the mold. In the case where the above-described membrane is mounted on the mold, the plungers may be of substantially equal length such that when moved to the second position the membrane is substantially a planar surface. Consequently, if desired a separator such as a wire/band or the like may be passed between the membrane and the upper surface of the food product to further assist in the ejection of the food product from the mold.

Another aspect of the present invention is directed toward using a membrane to at least assist in the ejection of a formed three-dimensional food product from a mold having a mold face with a three-dimensional contour. A flow of a raw food material which is directed toward the mold face substantially conforms the membrane to the contour of the mold face and thus forms at least a portion of the upper surface of the food product with a three-dimensional contour. Thereafter, the formed food product is ejected from the mold due at least in part to the use of the membrane. Moreover, during/as a result of this ejection of the food product from the mold, a three-dimensional contour is generated on at least a portion of the lower surface of the food product. This may be provided by modifying the three-dimensional contour of the upper surface of the food product, and in the case where the lower surface of the food product initially has a planar surface, the contours of the upper and lower surfaces of the food product may actually be substantially inverted. Consequently, the upper surface of the food product would then be substantially planar such that the above-described separator could be passed between the membrane and food product to further assist in the separation of the food product from the mold, while the lower surface would have the desired three-dimensional contour. As noted above, in this case it may be desirable to use the above-described plunger assembly as well to provide a substantially planar surface for the membrane.

DETAILED DESCRIPTION

Figure 1:
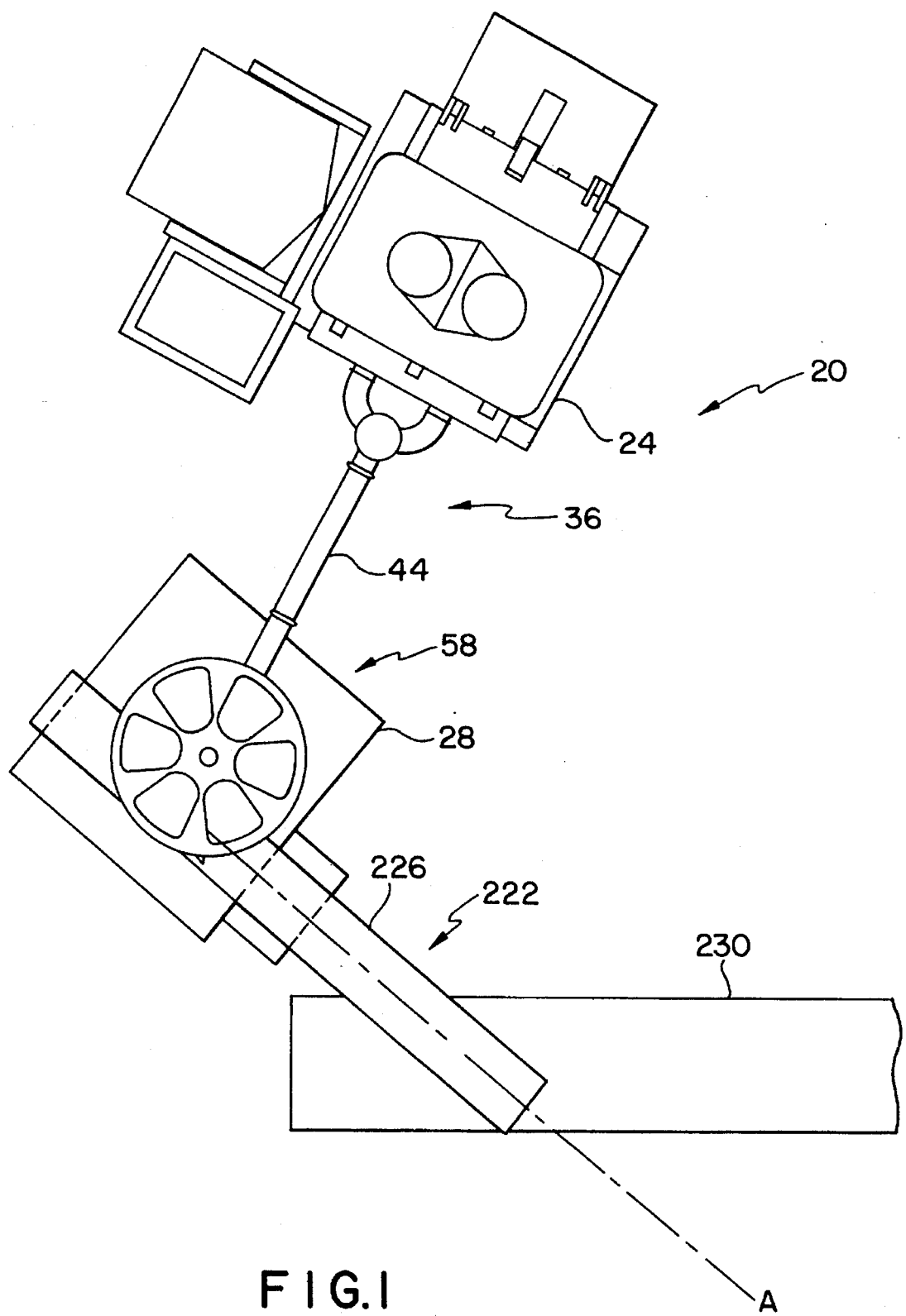
FIG. 1 is a general schematic view of a product formation system which may incorporate/utilize a three-dimensional food product forming apparatus and method in accordance with principles of the present invention.

The present invention will be described with reference to the accompanying drawings which assist in illustrating the pertinent features thereof. Generally and in the case of the product forming system 20 of FIG. 1, raw food material is provided to the product former 28 by a product pump 24. The product former 28 shapes/molds a product from such raw food material, preferably into a desired three-dimensional contour as will be discussed in more detail below, and thereafter successively provides such products to a product transfer system 222. More particularly, the product former 28 deposits the three-dimensional food products onto a spreader conveyor 226, interconnected with the product former 28, which thereafter deposits such products onto a processing belt 230 for delivery to subsequent processing/packaging systems.

Figure 2:
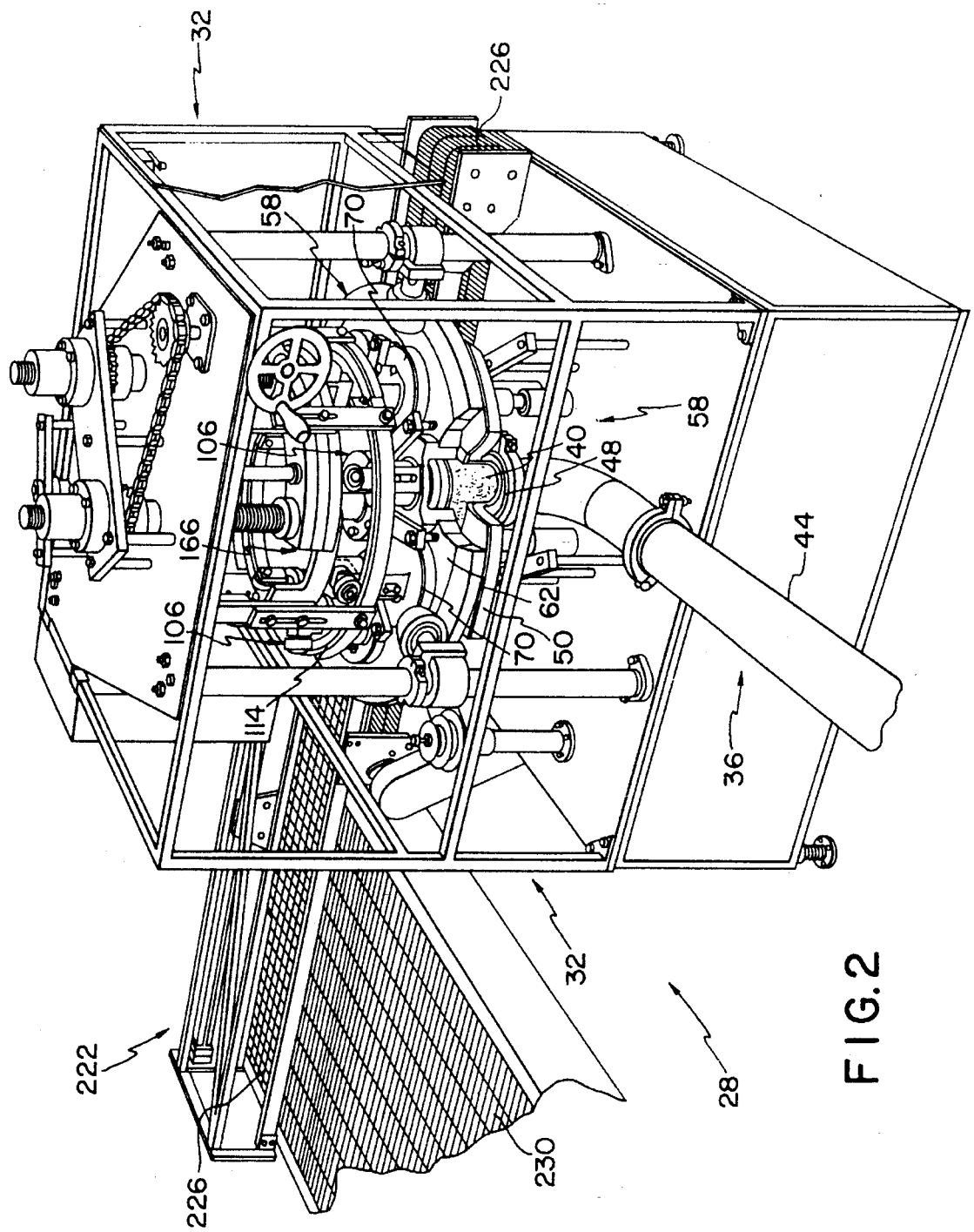
FIG. 2 is a perspective view of one embodiment of a three-dimensional product former in accordance with principles of the present invention.
Figure 3:
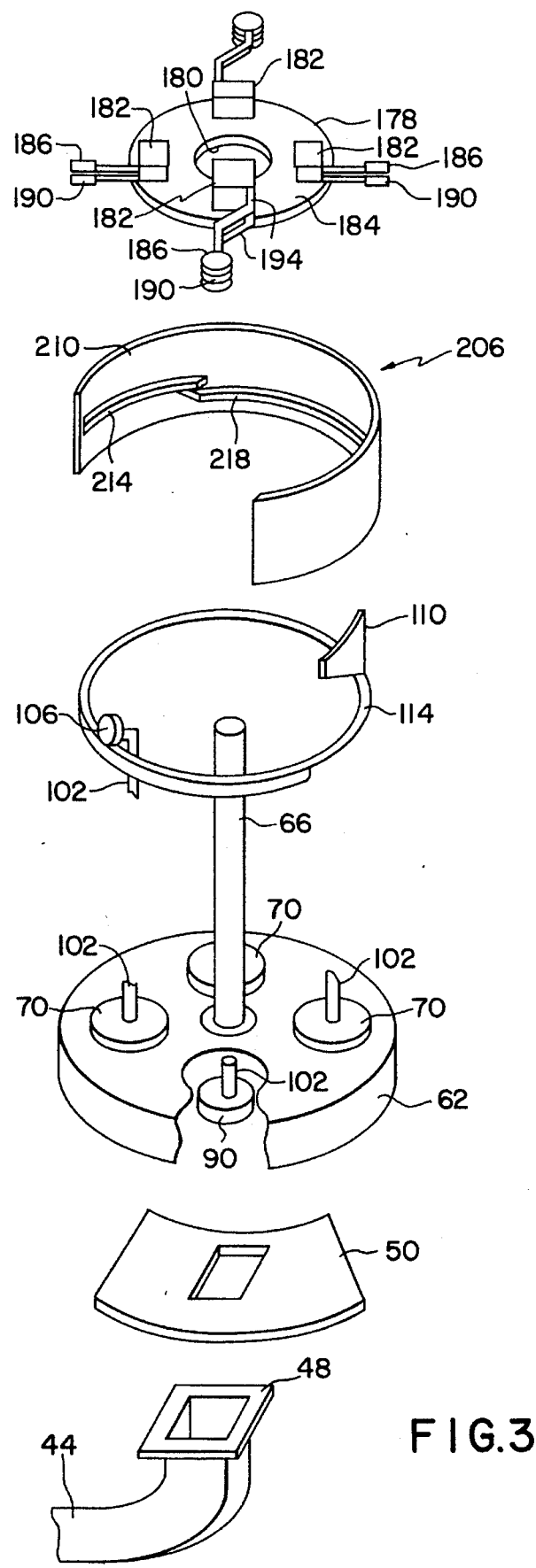
FIG. 3 is an exploded, perspective view of certain portions of the product former of FIG. 2.

One embodiment in accordance with principles of the present invention is more particularly illustrated in FIGS. 2–3. As noted above, the product former 28 preferably produces three-dimensional food products from a raw food material and positions such products onto a discharge area in a desirable manner. In this regard, the product former 28 has a frame assembly 32 which supports its various components, including a feed and forming assembly 36, 58. The feed assembly 36 provides the raw food material 40 to the forming assembly 58 which shapes/molds such material 40 into a product having a desired three-dimensional configuration. More particularly, the forming assembly 58 includes a rotating cavity plate 62 having a plurality of circumferentially-spaced forming stations 70 attached thereto. When a particular forming station 70 is rotated over the feed assembly 36, raw food material 40 is provided to such forming station 70 and a single three-dimensional food product is desirably shaped/molded therein. Upon further rotation of the cavity plate 62 to position the identified forming station 70 over the spreader conveyor 226, the product is effectively ejected therefrom onto the spreader conveyor 226 which thereafter deposits such products onto the processing belt 230. In this regard, the spreader conveyor 226 and product former 28 may assume a variety of orientations relative to the processing belt 230 depending upon a number of factors, as illustrated by the differing orientations of FIGS. 1 and 2.

The feed assembly 36 provides the raw food material to the forming assembly 58 and includes an infeed pipe 44. One end of the infeed pipe 44 is connected to an appropriate product pumping apparatus (e.g., the product pump 24 of FIG. 1), while the other end is connected to an infeed manifold 48 which is positioned below the rotatable cavity plate 62 of the forming assembly 58. An upper portion of the infeed manifold 48 is aligned with an opening in a stationary seal plate 50 which slidably engages with the rotating cavity plate 62. This opening is vertically alignable with each forming station 70 on the cavity plate 62. Consequently, when each forming station 70 is rotated over the infeed manifold 48, raw food material is forced under pressure into each such forming station 70 to form the three-dimensional food product therein. In order to assist in the separation of the raw food material from the formed product now contained within the given forming station 70, a knife cut-off is positioned on a peripheral portion of the seal plate 50 or the infeed manifold 48. Therefore, as each forming station 70 rotates out of alignment with the infeed manifold 48, the knife cut-off effectively severs the raw food material from the formed product.

The forming assembly 58 is interconnected with the feed assembly 36 to receive the raw food material therefrom and shape/mold such raw food material into a three-dimensional food product. More particularly, a plurality of forming stations 70 are circumferentially spaced on and connected to the rotatable cavity plate 62 which is typically rotated at a relatively high speed (e.g., up to 50 RPM) by a central drive shaft 66. The central drive shaft 66 interconnects the cavity plate 62 to an appropriate drive source (not shown) such that the product former 28 is able to move each of the forming stations 70 at a desirable rate between the infeed manifold 48, where the raw food material is provided to and the product is formed in the given forming station 70, and the spreader conveyor 226, where such product is deposited for delivery to processing/packaging apparatus (not shown).

Figure 4:
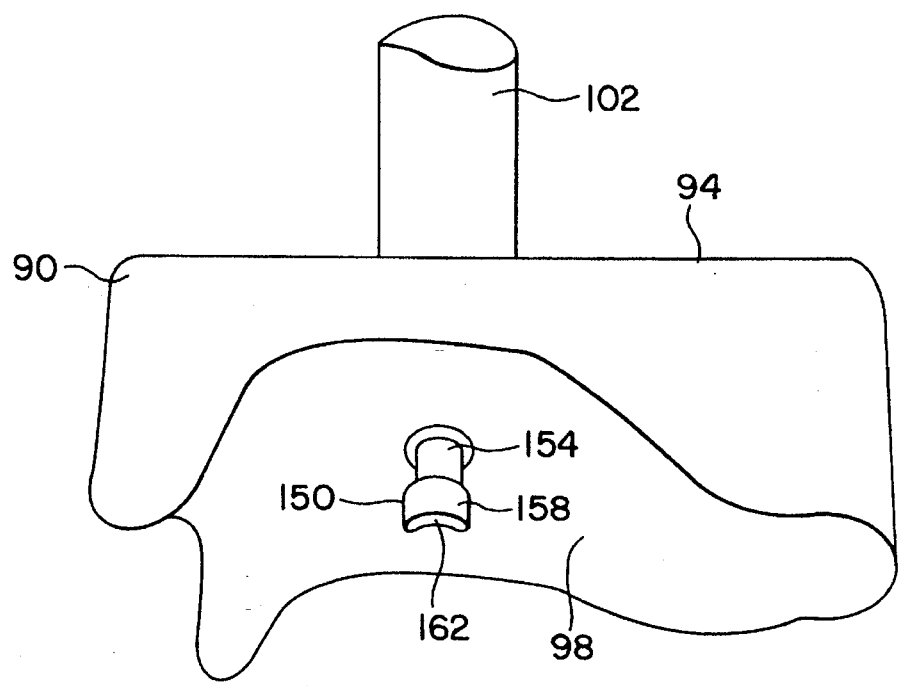
FIG. 4 is a perspective view of one embodiment of a mold/piston having a reciprocable ejection plunger.
Figure 5:
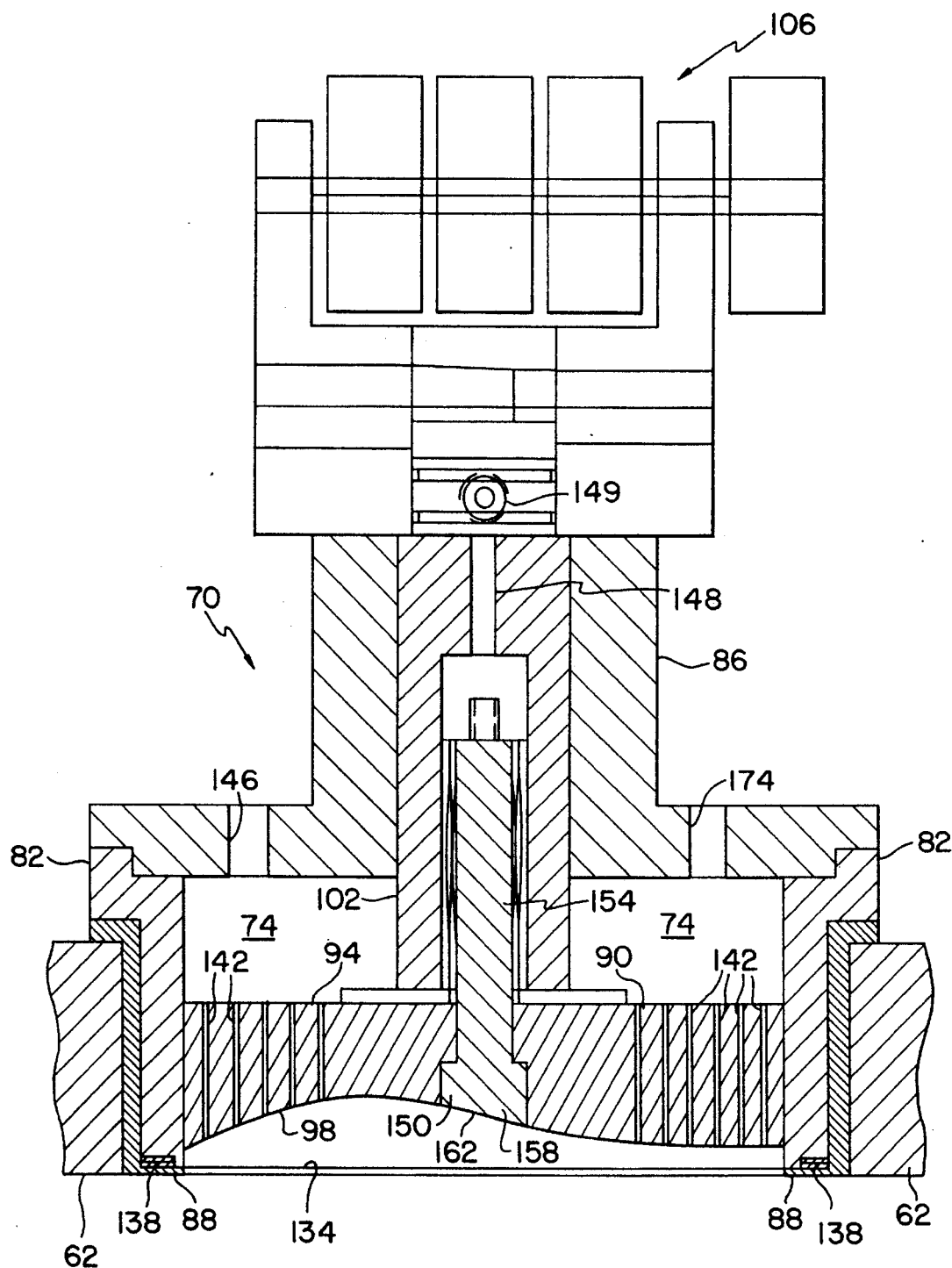
FIG. 5 is a longitudinal cross-sectional view of one embodiment of a forming station.

A three-dimensional product is shaped/molded in each of the forming stations 70 during rotation of the cavity plate 62 in the above-described manner. As illustrated in FIGS. 4–5, each forming station 70 includes a forming cavity 74, which is generally defined by a cavity cap 86 and a sleeve 82, and a mold or piston 90. The piston 90 is typically reciprocally positioned within the forming cavity 74, but such is not required by the present invention since the piston 90 may in fact function as a substantially stationary mold in shaping/molding the desired three-dimensional food products. Although the general shape of the perimeter of the forming cavities 74 may be substantially circular, those skilled in the art will appreciate that such may assume a variety of configurations to produce a desired perimeter configuration for the food product if desired. Nonetheless, the perimeter of the piston 90 will generally match the shape of the perimeter of its respective forming cavity 74. Consequently, in the event that the piston 90 is contoured to form a chicken breast, the forming cavity 74 will generally assume its peripheral configuration.

In the event that the pistons 90 are reciprocally positioned within the forming cavities 74, such reciprocation may be used to provide a variety of functions. For instance, reciprocation of the pistons 90 within the respective forming cavities 74 may be used to control the formation of the product and/or the ejection of such product from the forming cavity 74. More particularly, the flow of raw food material into a forming cavity 74 when aligned with the infeed manifold 48 may be used to force its associated piston 90 upwardly within the forming cavity 74. By providing the raw food material to a forming cavity 74 in this manner, a more consistent food product (e.g., weight) may be obtained, versus actually driving the piston 90 upwardly within the forming cavity 74 to draw or suck raw food material therein, although such is within the scope of the present invention. Although the amount of such upward movement may vary from application to application (e.g., the stroke is set for a given product run), in typical applications the stroke of the piston 90 is often less than one inch in producing many three-dimensional products. Control of this vertical positioning of the piston 90 is desirable and serves to maintain exact volumes between each formed product. This equates to very close tolerance between the weights of each formed product, typically ±½% total weight.

Reciprocation may also be used in the ejection of the product from the forming cavity 74. For instance, once the cavity plate 62 has rotated a certain degree, a push down cam 110 may lower the piston 90 within a forming cavity 74 having a product contained therein, namely by engaging a roller assembly 106 attached to the upper end of the piston shaft 102 and generally forcing such in a downward direction. This motion of the piston 90 coincides with the ejection of the product from the forming cavity 74 onto the spreader conveyor 226. A lift cam 114 may thereafter sufficiently raise the piston 90, again by engagement with the roller assembly 106 of the particular piston 90, to a proper position for rotation over the infeed manifold 48 to allow for repetition of the described cycle.

As can be appreciated, the extent of the upward travel of each piston 90 within the forming cavities 74 controls the amount of raw food material within each forming cavity 74, and thus the weight of the three-dimensional product. In order to allow for modification of the amount of raw food material within each forming cavity 74, the present invention may incorporate an adjustable portion control assembly 166 as generally illustrated in FIG. 2. The portion control assembly 166 is vertically aligned with each forming station 70 when positioned over the infeed manifold 48 and may be vertically adjusted relative to the cavity plate 62, and thus each forming station 70. Consequently, the portion control assembly 166 engages an upper portion of the roller assembly 106 for the aligned piston 90, and thus terminates further upward movement of such piston 90 within its forming cavity 74 to thereby regulate the amount of raw food material provided to the forming cavity 74.

The face 98 of the piston 90 generally defines the shape of the product, although in some cases the lower, perimeter portion of the food product may be actually defined by the sleeve 82 of the forming cavity 74. More particularly, the face 98 of the piston head 94 which interacts with the raw food material 40 has a three-dimensional contour (e.g., generally concavely-shaped) as illustrated in FIGS. 4–5 such that three-dimensional food products may be shaped/molded within each forming cavity 74. Since the contour of the piston face 98 has this three-dimensional contour, however, existing devices which assist in the separation of the formed food product from the piston face 98 would not be effective absent certain accommodations/additions (e.g., the use of the membrane 134 discussed below). For instance, the prior art separation system 286 illustrated in FIGS. 7–8 would not in all likelihood be able to effectively follow the contour of the piston face 98 to separate the food product therefrom.

Figure 7:
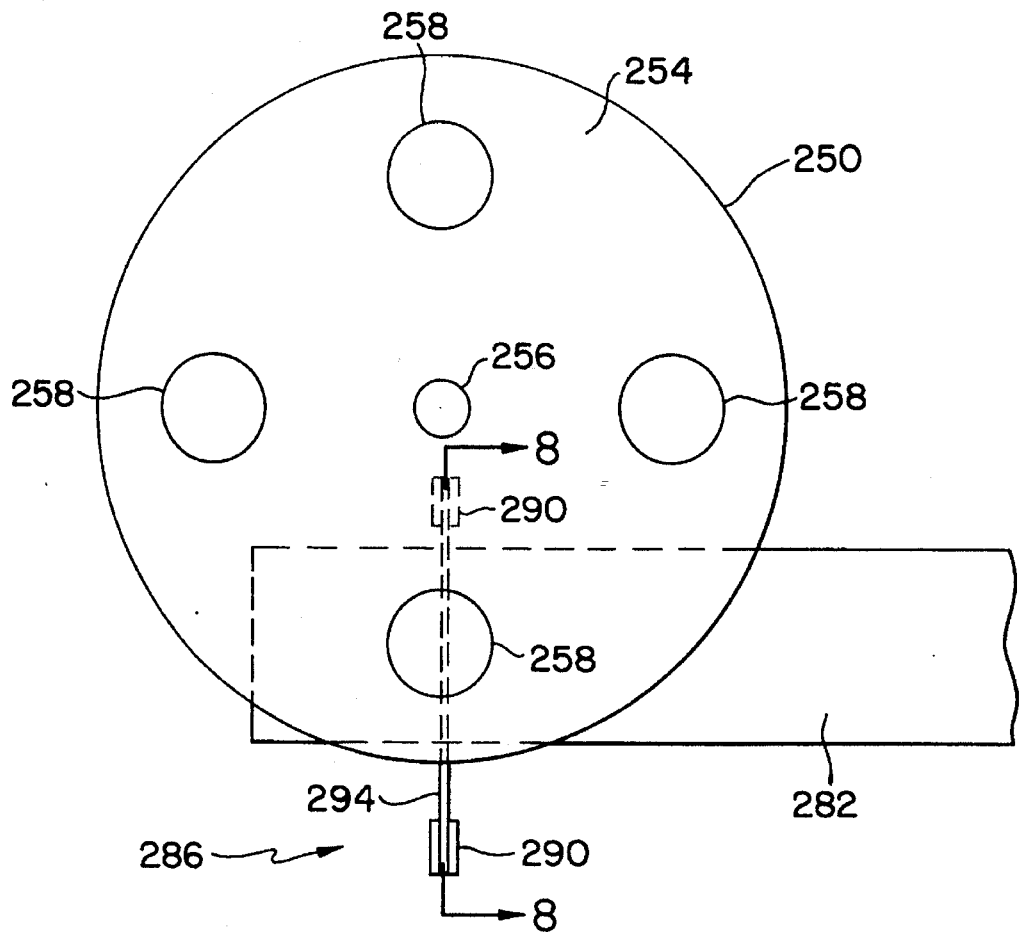
FIG. 7 is a top view of a prior art product separation system used with a turret-type patty forming machine.
Figure 8:
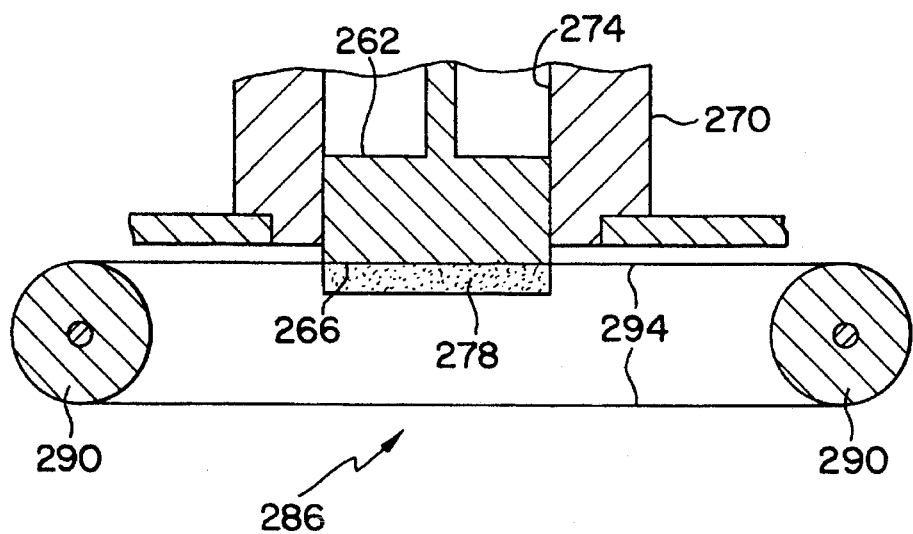
FIG. 8 is a cross-sectional view of the machine of FIG. 7 taken along line 8—8.
Figure 9A:
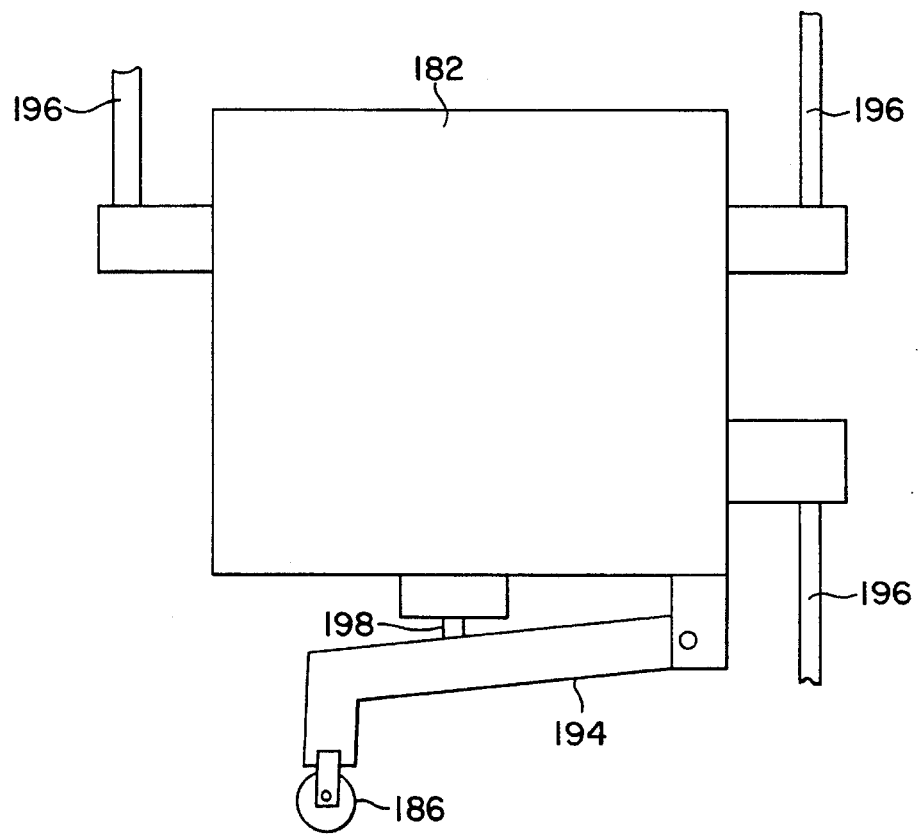
FIG. 9A is a top view of one station of the control harness of FIG. 3.
Figure 9B:
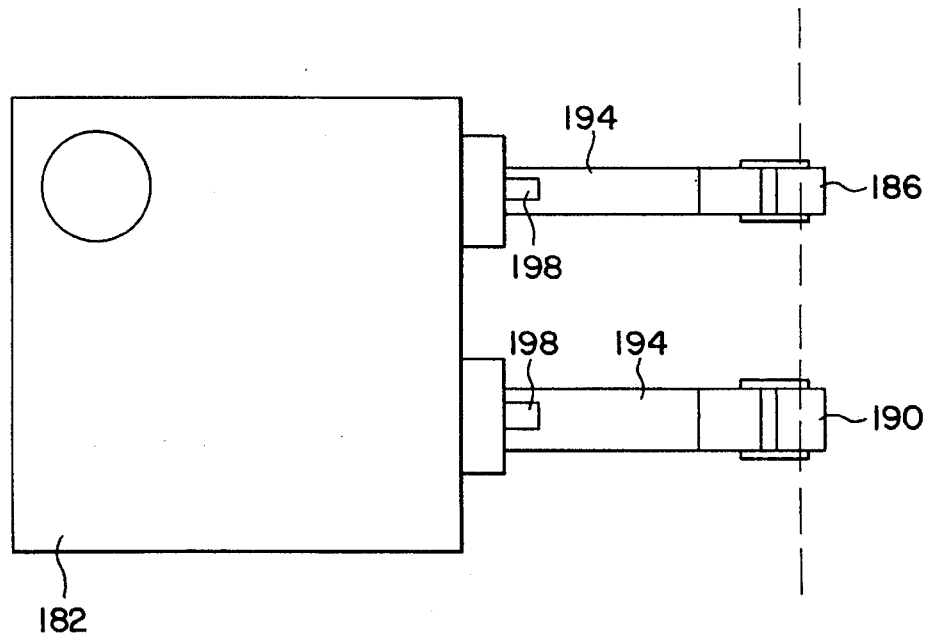
FIG. 9B is a side view of the station of FIG. 9A.
Figure 10:
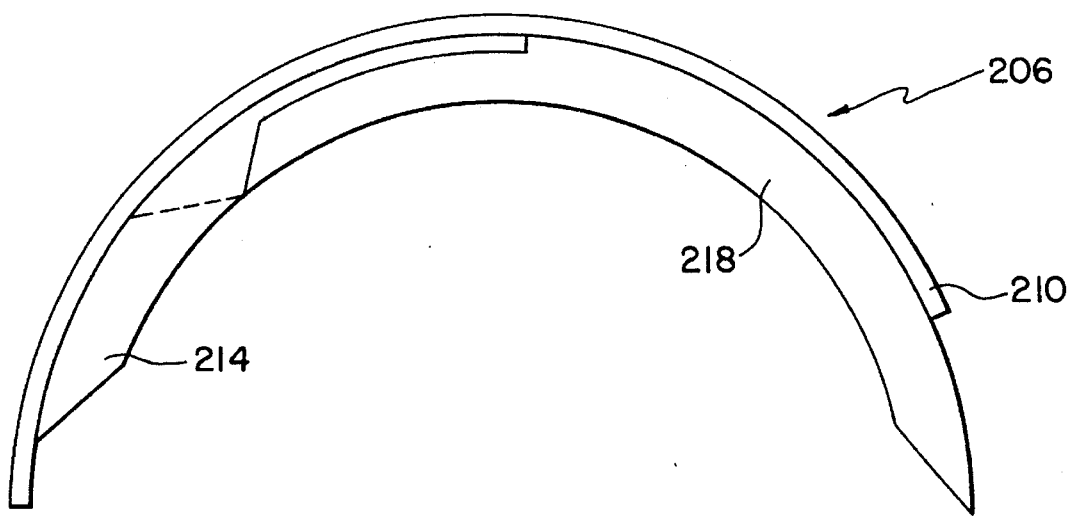
FIG. 10 is a top view of one embodiment of the air/vacuum cam assembly.
Figure 11:
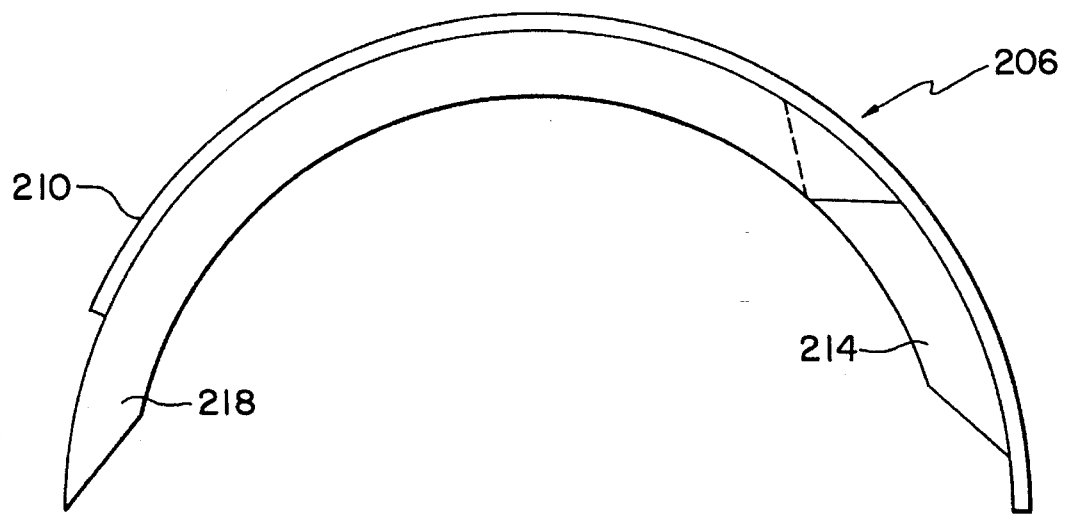
FIG. 11 is a bottom view of the air/vacuum cam assembly of FIG. 10.

The separation system 286 of FIGS. 7–8 is used in conjunction with a patty forming machine 258 which includes a rotatable turret 254 and a plurality of patty forming stations 258, each having a piston 262 reciprocally positioned therein. The face 266 of the piston 262 is planar and perpendicular to the sidewalls 274 of the cylinder 270 in order to form the desired two-dimensional, disc-shaped hamburger patty 278. In order to assist in the separation of the patty 278 from the piston face 266, the separation system 286 is positioned above a conveyor belt 282 and includes a wire 294 which is positioned around two displaced pulleys 290, one or both of which may be rotatably driven (not shown). Consequently, when a given patty forming station 258 is rotated toward the conveyor belt 282, the piston 262 is driven downwardly a certain distance below the bottom of the turret 254. Therefore, the wire 294 is able to engage the piston face 266 as it advances thereby to assist in the separation of the hamburger patty 278 from the piston face 266. Since the piston face 266 is substantially planar in this case, this type of product separation is quite effective. However, in the event that a three-dimensional contour is used as in the case of the piston face 98 associated with the present invention, it can be appreciated that it would be difficult and/or impractical to incorporate a system similar to the separation system 286 of FIGS. 7–8 for following the three-dimensional contour of the piston face 98.

Figure 6:
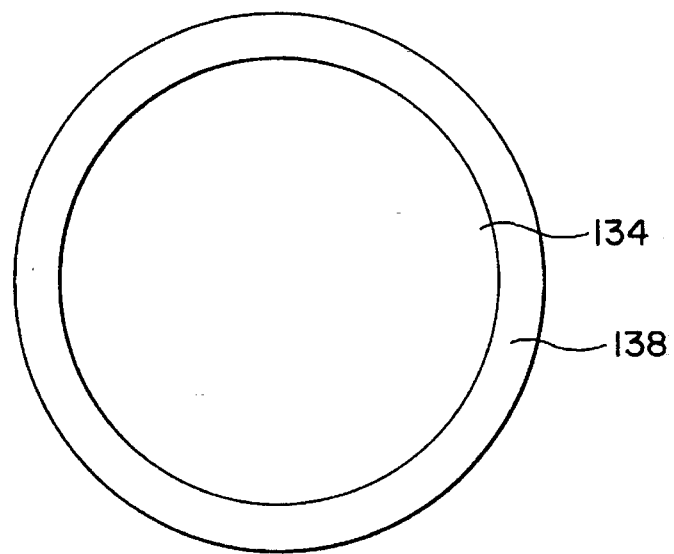
FIG. 6 is a top view of one embodiment of a membrane for interacting with the face of the piston.

In order accommodate for the desired three-dimensional contour of the piston face 98 and the continuing need to appropriately separate the formed product from the piston face 98 to provide such product to the spreader conveyor 226 for subsequent processing/packaging, the forming assembly 58 incorporates a membrane 134 which is positioned over the piston face 98 as illustrated in FIGS. 5–6. A mounting ring 138 is secured to a peripheral portion of the membrane 134 and may be positioned between an end of the sleeve 82 and a retainer clip 88 in order to effectively secure the membrane 134 to a bottom portion of the forming cavity 74. The mounting ring 138 thus remains substantially stationary relative to the membrane 134 during the provision of raw food material to each forming cavity 74 as will be discussed below.

The membrane 134 directly interacts with the raw food material when provided to the forming cavity 74, and thus must be formed from an FDA-approved material. Moreover, the interaction between the membrane 134 and the formed product must be such that the product is easily separable therefrom (i.e., the product should not stick to the membrane 134). Furthermore, the membrane 134 must be sufficiently flexible/pliable so as to substantially conform to the contour of the piston face 98 when forced thereagainst by the pressure of the raw food material from the infeed manifold 48 to provide the desired three-dimensional configuration for the product. Therefore, the membrane 134 may be formed from materials such as urethane, neoprene, nitrile or PVC, and is preferably formed from polyisoprene rubber.

The membrane 134 not only provides for a reduced frictional interaction between the piston face 98 and the food product, but it may be formed from a material which assists in the ejection of the product from the forming cavity 74 when positioned over the spreader conveyor 226. In this regard, the membrane 134 is preferably formed from a substantially elastic material, such as the above-identified polyisoprene rubber. Consequently, when raw food material is provided to a given forming cavity 74, the raw food material may not only force the piston 90 upwardly there-within (if a reciprocable interaction is utilized), but also forces the membrane 134 to stretch into conformance with the three-dimensional contour of the piston face 98 such that tensioning forces are generated within the membrane 134 itself. These built-in tensioning forces may thus be used to eject the product when a given forming station 70 is rotated over the spreader conveyor 226. More particularly, the inherent properties of the elastic material produces a self-contracting effect such that the membrane 134 moves away from the piston face 98 to eject the product at the desired time. Therefore, an external system is not required to achieve the desired ejection.

In the event that the seal plate 50 terminates prior to a given forming station 70 being positioned over the spreader conveyor 226 for ejection of the product, as illustrated in FIG. 2, it may be necessary/desirable to incorporate a vacuum assist system. Generally, this system draws a vacuum within each forming cavity 74 at the appropriate time to retain the membrane 134 against the piston face 98, which thereby retains the product within the forming cavity 74 until the required/desired ejection time. This may be provided by incorporating a vacuum hole 174 which extends through the cavity cap 86 as illustrated in FIG. 5 and which would be interconnected with an appropriate vacuum pump (not shown). Moreover, a plurality of preferably pin-hole-sized apertures 142 may extend through the entire piston head 94. Consequently, at any time prior to the bottom of the cavity plate 62 disengaging the seal plate 50, a vacuum may be drawn to retain the membrane 134, and thus the food product, in the desired position. When the forming station 70 is rotated over the spreader conveyor 226, the vacuum may then be released such that the product will be ejected from the forming cavity 74. Although the vacuum may be controlled in a variety of manners, the control harness 178 and air/vacuum cam assembly 206 provides for an effective control of this feature as will be discussed below.

When a forming station 70 is positioned over the spreader conveyor 226 and the vacuum is released as described, the membrane 134 will eject the formed product from the forming cavity 74 onto the spreader conveyor 226, particularly if formed from an elastic material as noted above. Notwithstanding the effectiveness of the elastic membrane 134 for this purpose, under some circumstances it may be desirable for the food product to consistently assume a particular position on the separator 226, such as about the centerline A of the spreader conveyor 226 of FIG. 1. In order to increase the accuracy of the depositing of the product onto a specific location of the spreader conveyor 226, the present invention may incorporate a number of features to assist the membrane 134 in moving away from the piston face 98 to thereby eject the product from the forming cavity 74 in a desired manner.

In one embodiment, a forced-air system is utilized and may include an air-eject hole 146 in the cavity cap 86 as illustrated in FIG. 5. Air may thus be provided through the air-eject hole 146 by an appropriate source (not shown) when the forming station 70 is in a certain position such that the air will then flow through the plurality of the above-identified apertures 142 in the piston head 94. This flow of air will thus act on the membrane 134 and assist such in its movement away from the piston face 98, which thus assists in the ejection of the formed product from the forming cavity 74.

In another embodiment, a plunger 150 may be reciprocally positioned within the piston 90 as illustrated in FIG. 4–5. When the plunger 150 is in a first position, its face 162 forms a portion of the three-dimensional contour of the piston face 98 as illustrated in FIG. 5. However, when a given forming station 70 is rotated over the spreader conveyor 226, the plunger 150 may be activated by the forced-air system or an appropriate alternative drive system to downwardly advance the plunger 150 relative to the piston 90 to a second position as illustrated in FIG. 4 such that the face 162 of the plunger 150 exerts a force on the membrane 134 to assist in the movement thereof away from the piston face 98. An appropriate return mechanism such as a spring may then be used to return the plunger 150 to its original position. Depending upon a variety of considerations, it may be desirable to use the plunger 150 and/or the above-described air ejection alternative either individually or in combination.

Although the above-discussed vacuum assist system and forced-air system may be provided in a variety of manners, in one embodiment all of such are pneumatically controlled/activated. In this regard, a control harness 178 is positioned upon and rotates with the central drive shaft 66 and interacts with an air/vacuum cam assembly 206 as illustrated in FIGS. 3, 9A–B, and 10–11. The air/vacuum cam assembly 206 includes a housing 210 which may be appropriately attached to the frame assembly 32 or another appropriate supporting structure. The forced-air and vacuum-assist cams 214, 218 are mounted on the housing 210 for interaction with the control harness 178.

The control harness 178 generally includes a number of control stations 182 which coincide with the number of forming stations 70 and which are positioned on a mounting plate 184 having a hole 180 therethrough for interacting with the central drive shaft 66. Each control station 182 includes a forced-air roller 186 and a vacuum-assist roller 190. When the central drive shaft 66 and thus the cavity plate 62 rotates during operation of the product former 28, the vacuum-assist roller 190 associated with a given forming station 70 is pivoted inwardly when engaged with the vacuum-assist cam 218. The pivot arm 194 of this roller 190 thereby compresses a switch 198 which initiates the vacuum pump (not shown) to draw a vacuum in the above-described manner. When the forming station 70 approaches the spreader conveyor 226, the vacuum-assist roller 190 disengages the vacuum-assist cam 218, and thus pivots out of substantial contact with the associated switch 198, which terminates the vacuum draw in the given forming cavity 74. Substantially simultaneously therewith, the forced-air roller 186 engages the forced-air cam 214 and is pivoted to initiate the application of forced air into the given forming station 70. In the event the air-eject hole 146 is utilized, this air will enter the associated forming cavity 74 through the air-eject hole 146 and will flow through the apertures 142 to move the membrane 134 in the above-described manner. In the event that the plunger 150 is utilized, this air may flow through the plunger air inlet 149 through a plunger air hole 148 to exert a force on an upper portion of the plunger 150 to drive it downwardly to move the membrane 134 in the above-described manner. In providing this air and/or vacuum capabilities, a plurality of hoses 196 may be incorporated on the control harness 178 for interconnection with the forced-air and vacuum supplies, as well as for interconnection with the associated forming station(s) 70.

The general operational sequence of the product former 28 is generally illustrated in FIGS. 12A–D. Initially, it will be appreciated that the principles of the present invention may be embodied within a single forming station 70, as well as a plurality of forming stations 70. Moreover, these stations 70 may be incorporated into a turret-type product former as described herein or other multiple station product formers (e.g., slide plates which incorporate a plurality of forming stations). Furthermore, as noted above, the pistons 90 need not necessarily be reciprocally positioned within the forming cavities 74, but instead may be substantially stationary. In addition, the air-ejection system and/or the ejection plunger 150 need not necessarily be utilized in the event that the membrane 134 is formed from a substantially elastic material. Therefore, for simplicity of illustration a single forming station 70 is presented in FIGS. 12A–D and the piston 90 does not reciprocate and only utilizes the membrane 134 for ejection of the food product.

Figure 12A:
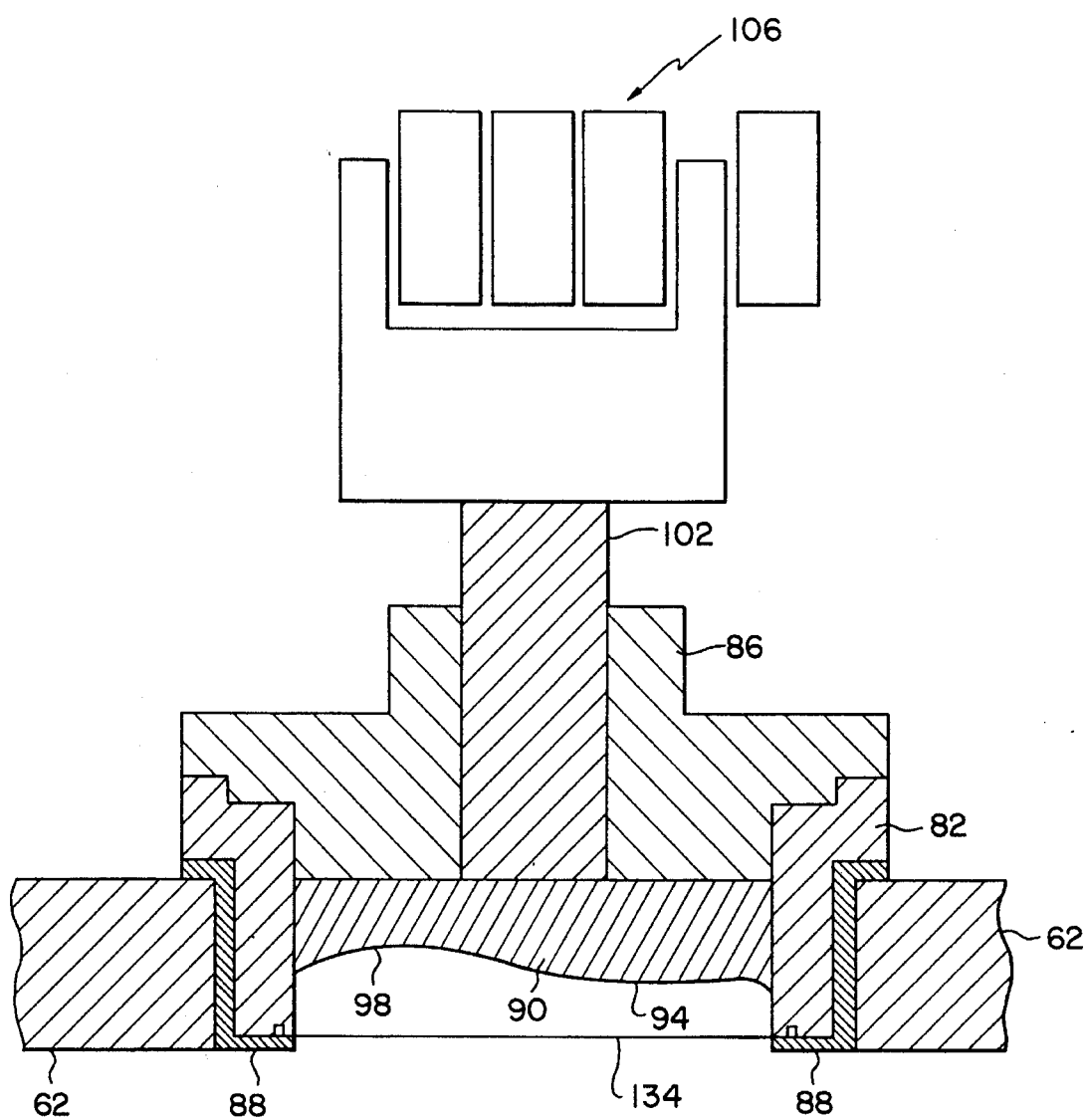
FIG. 12A is a cross-sectional view of one embodiment of a forming station prior to being rotated over an infeed manifold.
Figure 12B:
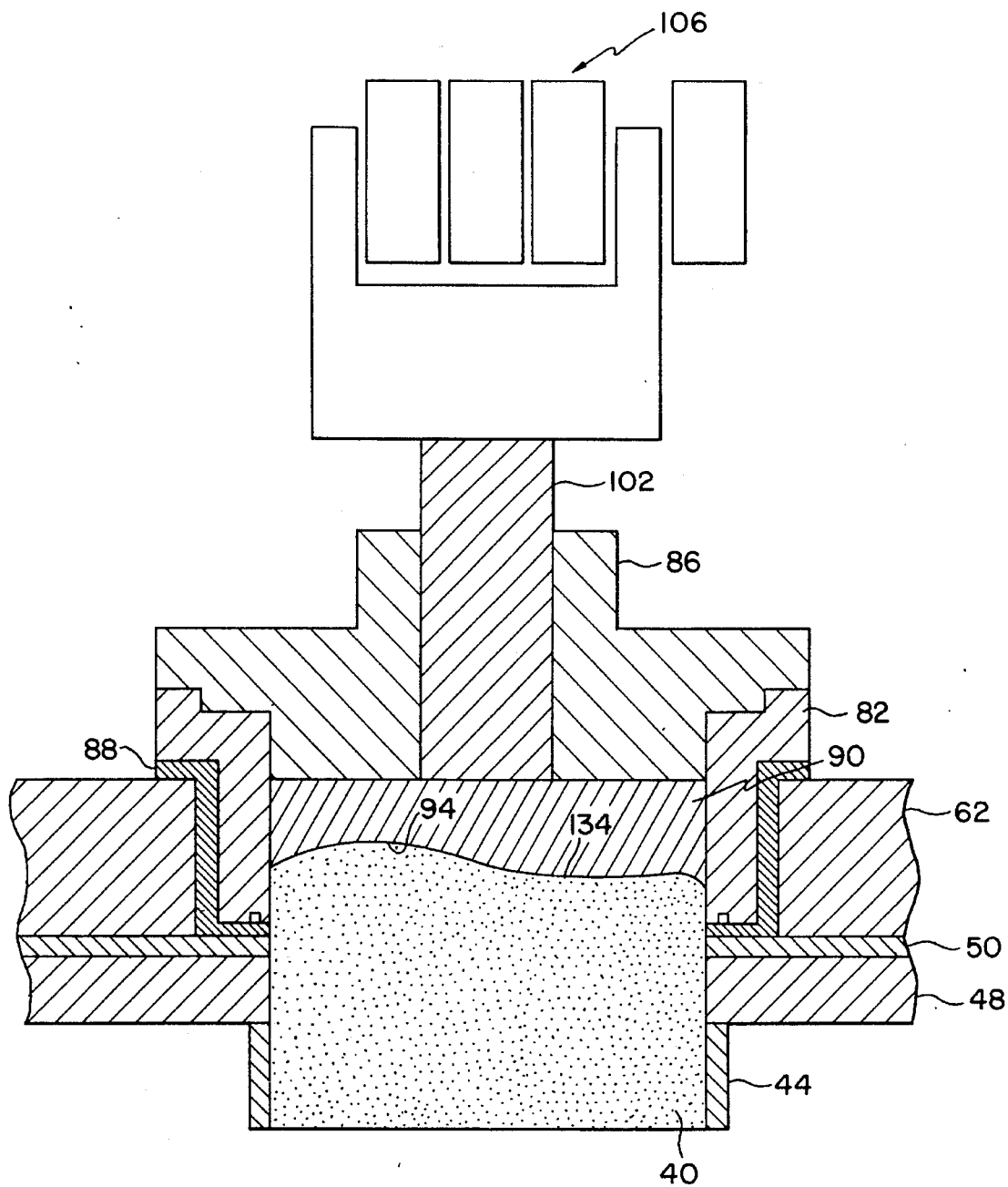
FIG. 12B is a cross-sectional view of the forming station of FIG. 12A in alignment with one embodiment of an infeed manifold, the product having forced the membrane to conform with the contour of the piston face.

Referring to FIG. 12A, the piston 90 is illustrated as being slightly above the bottom of the cavity plate 62 and the membrane 134 is in an undeformed state. In the event that the piston 90 was reciprocable relative to the forming cavity 74, the piston 90 would be maintained in a similar position by the engagement of its associated roller assembly 106 with the lift cam 114 (FIGS. 2–3) as noted above, but would have a clearance between its upper portion and the cavity cap 86 to move upwardly when receiving raw food material. When the forming station 70 is rotated over the infeed manifold 48 as illustrated in FIG. 12B, raw food material 40 is provided to the forming cavity 74 under pressure such that the elastic membrane 134 is stretched to substantially conform to the three-dimensional contour of the piston face 98. As previously noted, this flow could also be used to advance the piston 90 upwardly within the forming cavity 74 until engagement with the portion control assembly 166 in the case of a reciprocable piston 90.

Figure 12C:
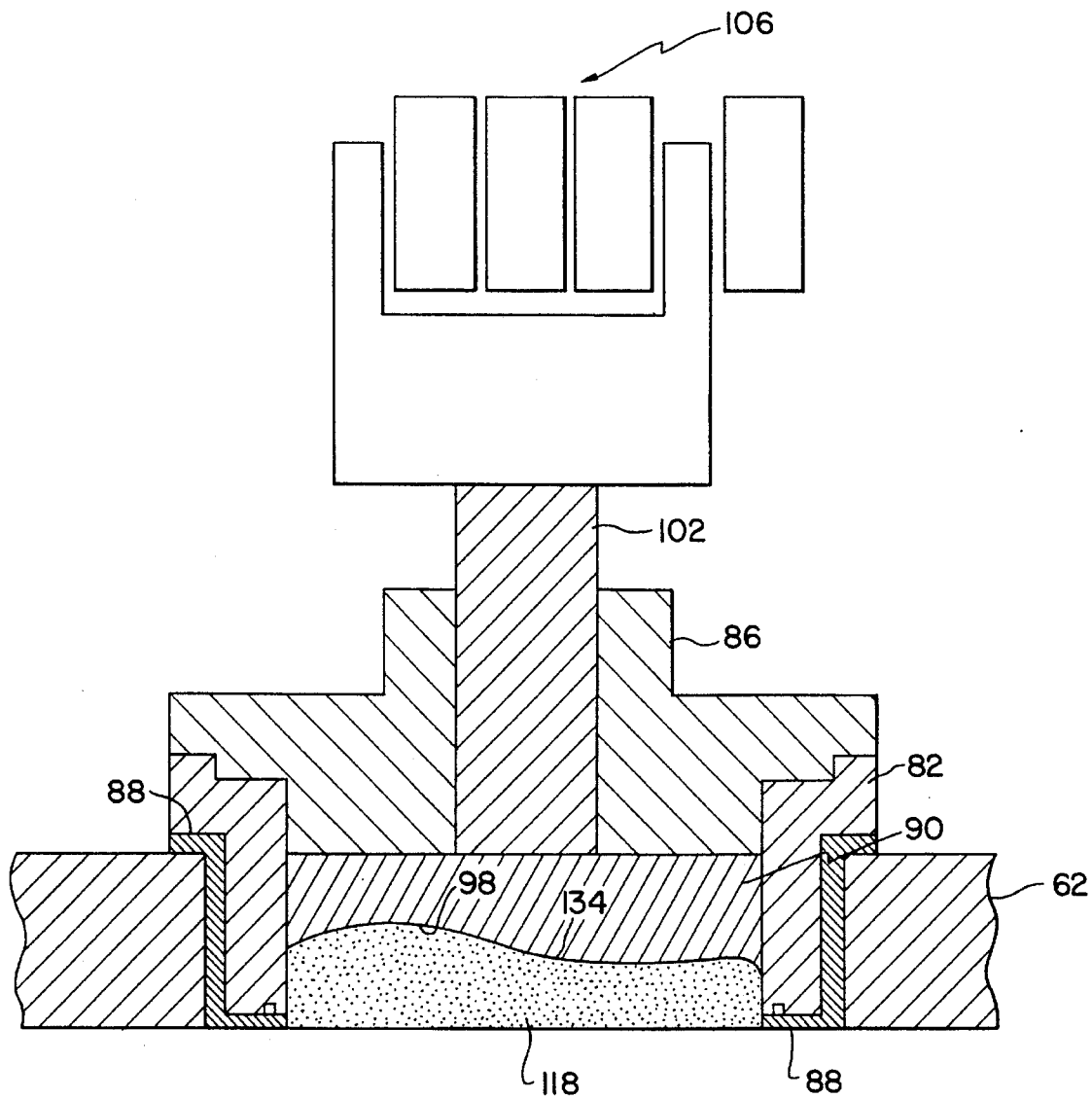
FIG. 12C is a cross-sectional view of the forming station of FIG. 12A having rotated out of alignment with the infeed manifold.

As the forming station 70 rotates out of alignment with the infeed manifold 48, the raw food material 40 is severed by the knife cut-off, and thus the product 118 is completely formed as illustrated in FIG. 12C. Since the forming station 70 rotates out of alignment with the seal plate 50 to expose the food product 118 within the forming cavity 74 at this time, the vacuum-assist system is activated by the pivoting of the vacuum-assist roller 190 associated with the particular forming station 70 due to engagement with the vacuum-assist cam 218 (FIGS. 3, 9A, 9B, 10–11). The membrane 134 is thus retained against the piston face 98, and the product 118 is maintained within the forming cavity 74. In order to reduce the potential for damage to the membrane 134, the vacuum may actually be drawn prior to initially rotating each forming station 70 over the seal plate 50 and/or infeed manifold 48 such that the membrane 134 will not catch/tear on the seal plate 50 and/or the infeed manifold 48.

Figure 12D:
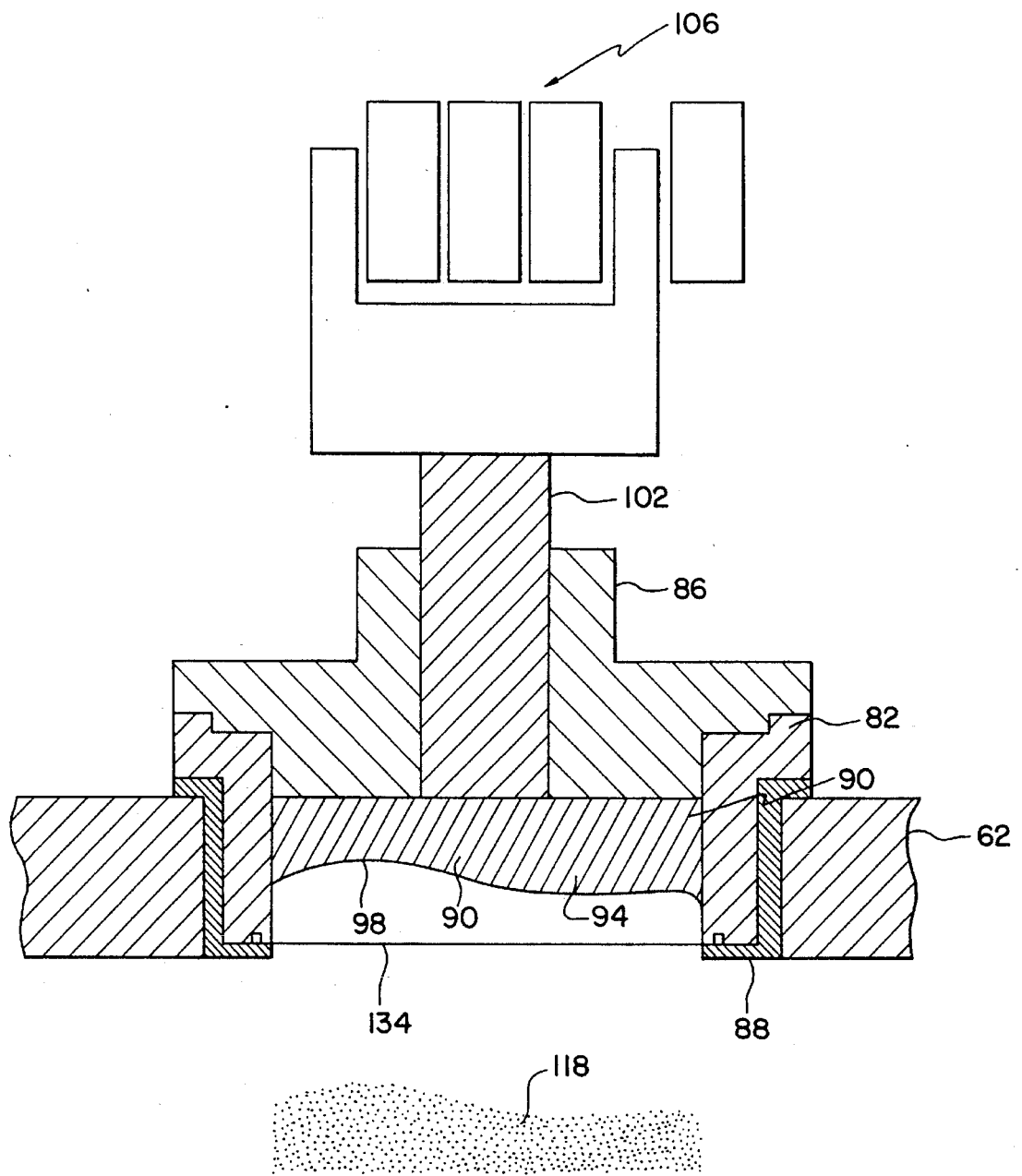
FIG. 12D is a cross-sectional view of the forming station of FIG. 12A ejecting the formed food product.

When the forming station 70 is rotated over a desired area, such as the spreader conveyor 226, the vacuum is released by the disengagement of the vacuum-assist roller 190 and the vacuum-assist cam 218. The elasticity of the membrane 134 thus moves the membrane 134 away from the piston face 98 to eject the product 118 from the forming cavity 74 as illustrated in FIG. 12D. In order to assist the membrane 134 in this movement, the forced-air system may be activated by a pivoting of the forced-air roller 186 by engagement with the forced-air cam 214. Therefore, forced air may be directed through the apertures 142 in the piston head 94 and/or the plunger 150 may be driven downwardly away from the piston face 98, either or both of which assists the membrane 134 in its movement away from the piston face 98 to eject the product from the forming cavity 74 in a more accurate manner, again although not shown in FIG. 12D.

A modified forming station in accordance with principles of the present invention is illustrated in FIGS. 13 and 14A–D. Initially referring to FIG. 13, forming station 334 includes a piston assembly 300 positioned within a forming cavity 336 and such would thereby replace the forming station 70. Consequently, the forming station 334 may be used in a turret-type product former, as well as slide plate product formers as discussed above.

The piston assembly 300 includes a mold or piston 302 attached to the lower end 306 of a piston shaft 304, a plunger assembly 320 attached to the lower end 324 of a plunger shaft 322, a piston-mounted membrane 340 mounted on the piston 302, and a piston cap 350 connected to the piston back 310. The forming assembly 300 illustrated in FIG. 13 can thus be used to replace the piston 90, piston shaft 102, membrane 134, plunger 150, and plunger shaft 154 of the embodiment shown in FIG. 5. Moreover, the type of vertical drive system presented with regard to the piston 90 may be used by both the piston 302 and plunger assembly 320 (e.g., roller assemblies positioned on the upper ends of the respective shafts and utilizing appropriate lift and push down cams similar to push down cam 110 and lift cam 114 discussed above).

In the assembled condition, the membrane 340 wraps around the piston 302 and the piston cap 350 is appropriately secured (e.g., by screws not shown) to the piston back 310 to secure the membrane 340 therebetween. A plurality of plungers 328 on the plunger assembly 320 are aligned with a plurality of holes 316 in the piston 302 and the plunger assembly 320 is movable linearly with respect to the piston 302 such that the plurality of plungers 328 are selectably movable between a retracted position, wherein the plungers 328 are recessed within the piston face 312, and an extended position, wherein the plungers 328 protrude through and extend beyond the piston face 312.

The piston 302 is reciprocally positioned within the forming cavity 336 (FIGS. 14A–D) such that reciprocal movement of the upper end 308 of the piston shaft 304 (by, e.g., a roller assembly as described in the previous embodiment) provides reciprocal movement to the piston 302. The piston 302 generally includes a piston face 312 which defines the shape of a portion of the food product 360, a piston side 314 which defines the perimeter of the piston 302 and which may be of substantially uniform height to assist the performance of the piston mounted membrane 340, and a piston top or back 310 connected to the piston shaft 304. Similar to the embodiment of FIG. 5, the perimeter of the piston 302 is generally contoured to match the shape of the perimeter of the forming cavity 336. Unlike the embodiment shown in FIG. 5, however, the effective "diameter" of the piston 302 is slightly smaller than the effective "diameter" of the forming cavity 336, thus allowing space for a portion of the membrane 340 to be positioned therebetween, as described herein. The piston 302 is further provided with a plurality of through-holes 316 extending from the piston back 310 to the piston face 312 to allow the plungers 328 of the plunger assembly 320 to extend therethrough, as described herein.

The plunger assembly 320 is similarly reciprocally positioned within the forming cavity 336 adjacent the piston back 310. The plunger assembly 320 includes a plunger plate 330 connected to the lower end 324 of a plunger shaft 322 and from which a plurality of substantially equal-length plungers 328 extend downwardly toward and in alignment with the through-holes 316 in the piston 302. The diameter of the plungers 328 is slightly smaller than the diameter of the through-holes 316 such that the plungers 328 can reciprocate freely within and through the through-holes 316 when the plunger assembly 320 is reciprocated relative to the piston 302.

The plunger shaft 322 is a hollow tubular member reciprocally positioned within the forming cavity 336 in surrounding and coaxial relationship with the piston shaft 304. The lower end 324 of the plunger shaft 322 is rigidly secured to the plunger plate 330 such that reciprocal movement to the upper end 326 of the plunger shaft 322 (by, e.g., a roller assembly, as described in the previous embodiment with regard to the piston 90) provides reciprocal movement to the plunger plate 330 and plungers 328 relative to the piston 302 and the desired/required time. Such relative movement of the plunger assembly 320 relative to the piston 302 allows the plungers 328 to move between at least first and second positions: the first position corresponding with the plungers 328 being substantially recessed within the piston 302 and the second position corresponding with the plungers 328 being extended downwardly through and displaced outwardly from the piston face 312.

The membrane 340 of the present embodiment is a substantially bowl-shaped member having a substantially flat bottom portion 342 and a vertically-extending side portion 344 having a perimeter shaped to generally match the perimeter of the piston 302 and thus the forming cavity 336. The interior contour of the membrane 340 is generally shaped to conform to the exterior contour of the piston 302 such that the membrane 340 can be placed over the piston face 312 and piston side 314. The membrane 340 is further provided with a lip portion 346 protruding inwardly from the top of the side portion 344 around the full perimeter thereof. When the membrane 340 is placed over the piston face 312 and side 314, the lip portion 346 wraps at least partially around the piston back 310 to facilitate engagement of the membrane 340 to the piston 302. Consequently, the membrane 340 effectively utilizes a snap-fit mounting on the piston 302.

As with the previous embodiment, the membrane 340 must be sufficiently flexible/pliable so as to substantially conform to the contour of the piston face 312 when forced thereagainst by pressure of raw food material 362 from the infeed manifold 48 to provide the desired three-dimensional configuration for the food product 360. However, in order to prolong the useful life of the membrane 340, it must be formed from materials which will resist easy penetration and/or puncturing and/or be formed with a suitable wall thickness. Therefore, the membrane 340 may be formed from material such as urethane, neoprene, nitrile, pvc, and polyisoprene rubber. In addition, a membrane 340 formed from white nitril having a wall thickness of 5/32 inches has desirably performed.

In order to provide a substantially sealed enclosure for the plunger assembly 320, and further to provide additional securement of the membrane 340 to the piston 302 particularly when the height of the piston side 314 is not uniform, a piston cap 350 is appropriately secured (e.g., by screws not shown) to the piston back 310 with the lip portion 346 of the membrane 340 securely compressed therebetween. The piston cap 350 generally includes a cap top portion 352 shaped to match the contour of the piston 302. A cap side portion 354 extends downwardly from the cap top portion 352 around the perimeter thereof to form an inverted cavity for slidably receiving the plunger assembly 320. Near the center of the cap top portion 352, a cap hole 356 is provided to allow the plunger shaft 322 to slide therethrough. The diameter of the cap hole 356 is only large enough to allow the plunger shaft 322 to freely slide therethrough, but is small enough such that the gap between the cap hole 356 and the plunger shaft 322 is narrow enough to substantially prevent contaminants from entering therethrough to the plunger assembly 320.

Figure 13:
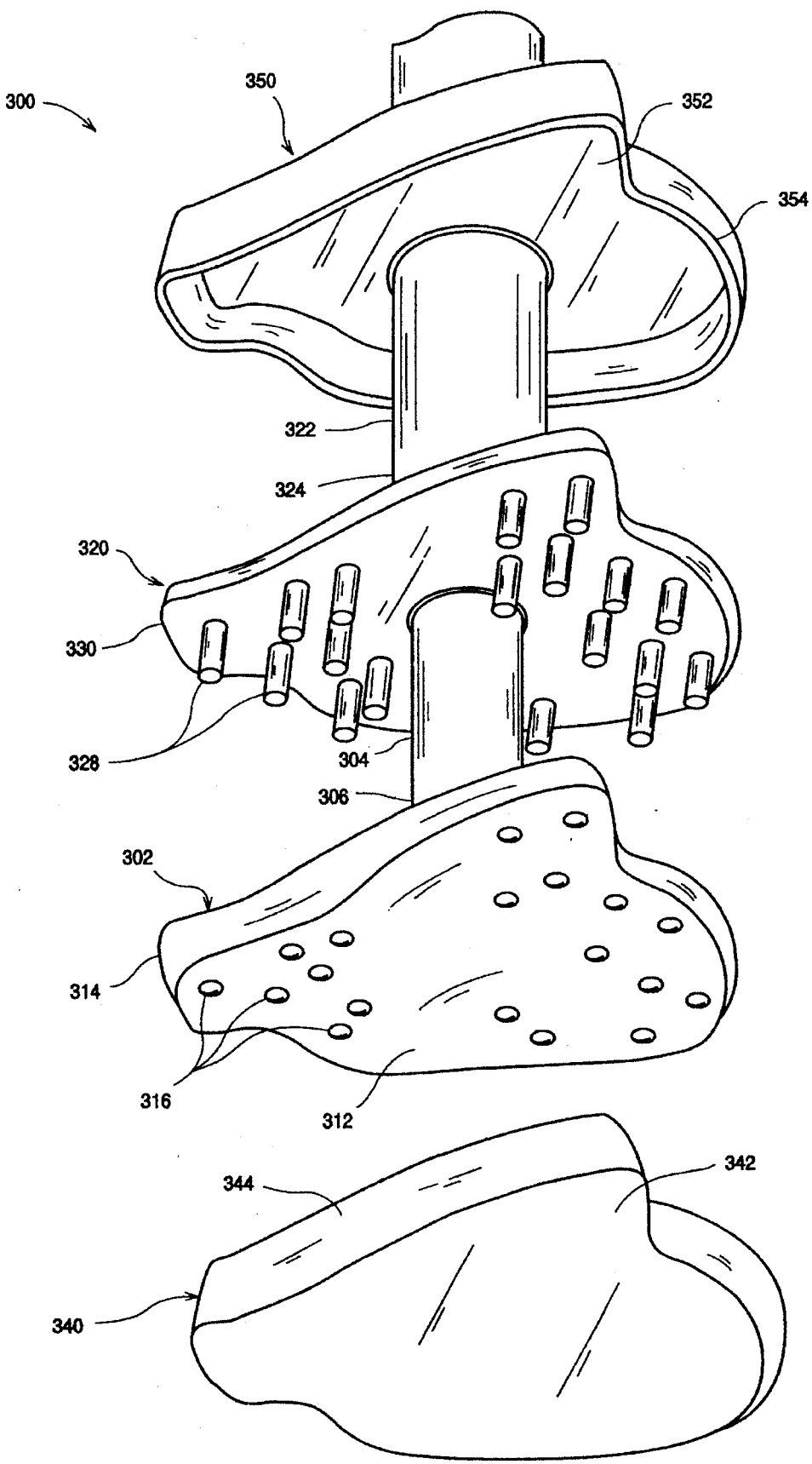
FIG. 13 is an exploded, perspective view of one embodiment of a forming assembly.
Figure 14A:
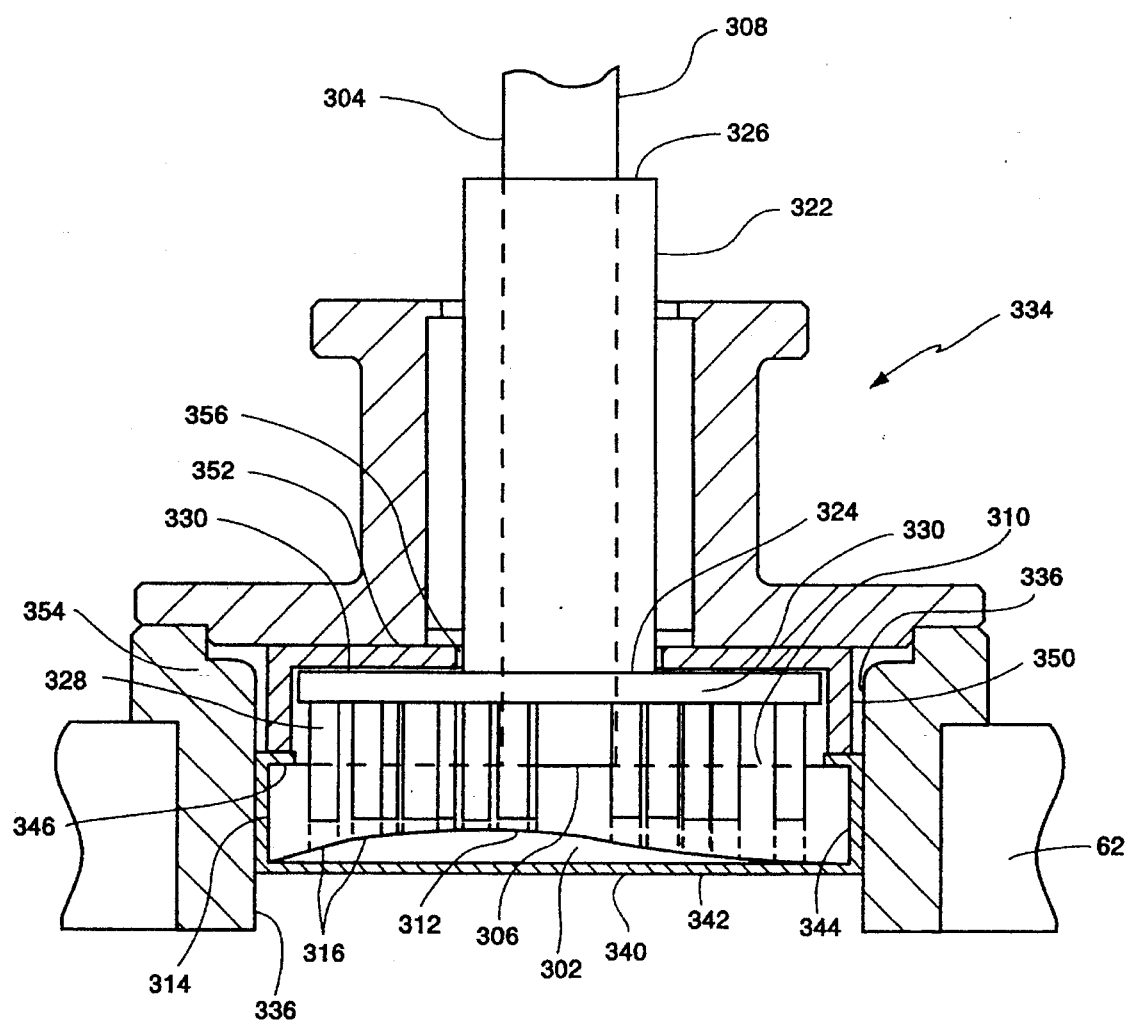
FIG. 14A is a cross-sectional view of one embodiment of a forming station utilizing the forming assembly of FIG. 13 prior to being rotated over an infeed manifold.

Referring to FIGS. 14A–D, in operation, the piston assembly 300 of FIG. 13 is assembled and appropriately positioned within the forming cavity 336 to provide the forming station 334. In the resting position, the piston 302 and plunger assembly 320 are in a raised position such that the plungers 328 do not protrude below the piston face 312, as shown in FIG. 14A. In this position, it can be seen that the bottom portion 342 of the membrane 340 is substantially flat and does not substantially conform to the contour of the piston face 312.

Figure 14B:
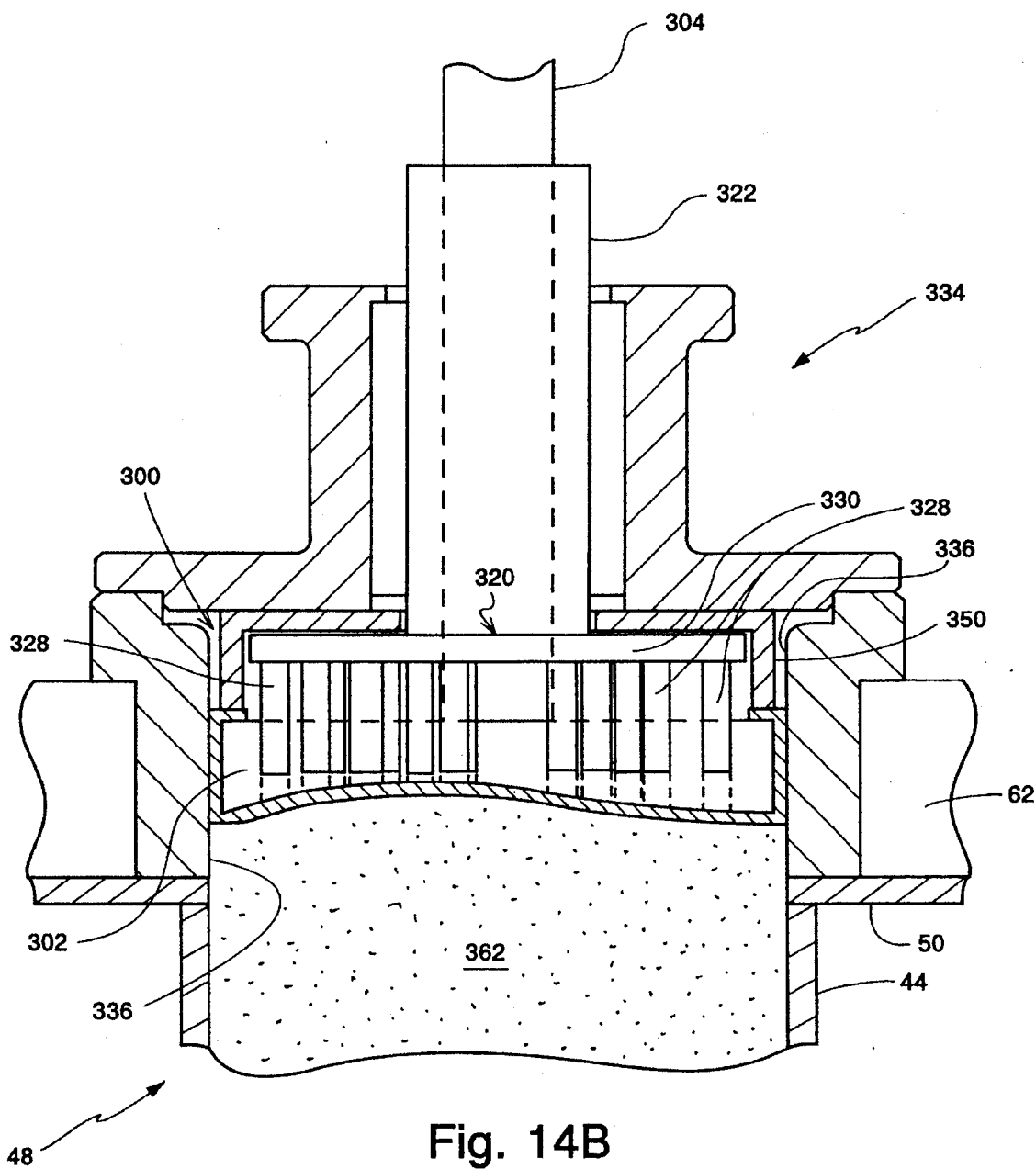
FIG. 14B is a cross-sectional view of the forming station of FIG. 14A in alignment with an infeed manifold having a supply of raw food material, the product having forced the membrane to substantially conform with the contour of the mold/piston face.

Utilizing a rotatable forming assembly 58 as described above and shown in FIGS. 1–3 or the above-discussed alternatives (e.g., slide plate), the forming station 334 is positioned within the cavity plate 62 and can thus be moved into alignment with the infeed manifold 48 to direct raw food material 362 toward the piston face 312, as shown in FIG. 14B. As the raw food material 362 is supplied to the forming cavity 336, the bottom portion 342 of the membrane 340 will generally conform to the contour of the piston face 312. By virtue of the tight fit between the piston 302, the membrane 340, and the perimeter of the forming cavity 336, as well as the flexibility/pliability of the membrane 340, raw food material 362 is substantially prevented from escaping between the membrane 340 and the perimeter of the forming cavity 74 to adversely affect the operation of the piston 302 and the plunger assembly 320. Furthermore, in the event that such raw food material 362 inadvertently escapes between the membrane 340 and the perimeter of the forming cavity 74 toward the piston back 310, the raw food material 362 will be substantially prevented from affecting the operation of the piston 302 and plunger assembly 320 by virtue of the piston cap 350, which substantially seals the plunger plate 330, the plungers 328 and the piston back 310 from contamination.

Figure 14C:
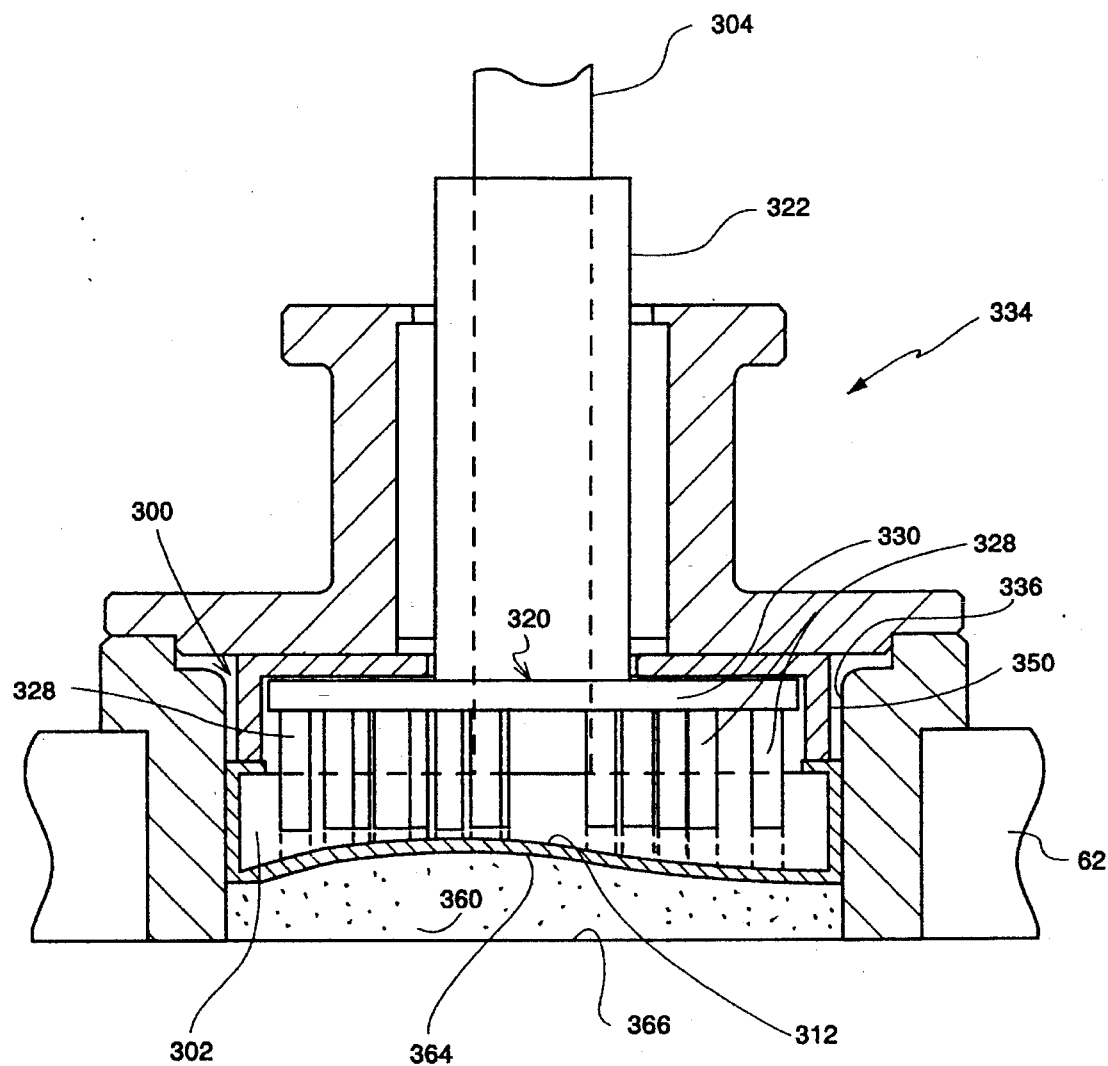
FIG. 14C is a cross-sectional view of the forming station of FIG. 14A having moved out of alignment with the infeed manifold.

After the product 360 is formed, the forming station 334 is moved out of alignment with the infeed manifold 48, such that the raw food material 362 is severed in the above-described manner to complete formation of the food product 360 as illustrated in FIG. 14C. In this case, the upper surface 364 of the food product 360 has a three-dimensional contour, while its lower surface 366 is substantially planar.

When the forming station 334 is moved over a desired area, such as the spreader conveyor 226, the piston 302 is advanced downwardly to force the food product 360 at least partially out of the forming cavity 336. The elasticity of the membrane 340 moves the bottom portion 342 of the membrane 340 away from the piston face 312 to assist in ejecting the food product 360 from the forming cavity 336. Furthermore, the plunger assembly 320 is lowered relative to the piston 302 such that the plungers 328 extend through and protrude beyond the piston face 312 to further assist in the ejection of the food product 360 from the forming cavity 336, as shown in FIG. 14D.

By virtue of the use of multiple plungers 328 with the tips of the plungers 328 arranged in a substantially planar relationship (i.e., the plungers 328 are all of equal length, and thus collectively defining a substantially planar surface), the force imparted to the membrane 340 by the plungers 328 is spread over a larger area and the resulting stress on the membrane 340 is substantially reduced. However, it should be appreciated that the benefits of using multiple plungers 328 can also be achieved utilizing plungers 328 of differing lengths (e.g., the tips of the plungers 328 may match the contour of the piston face 312 such the all portions of the membrane 340 are initially contacted by the plungers 328 at approximately the same time).

Figure 14D:
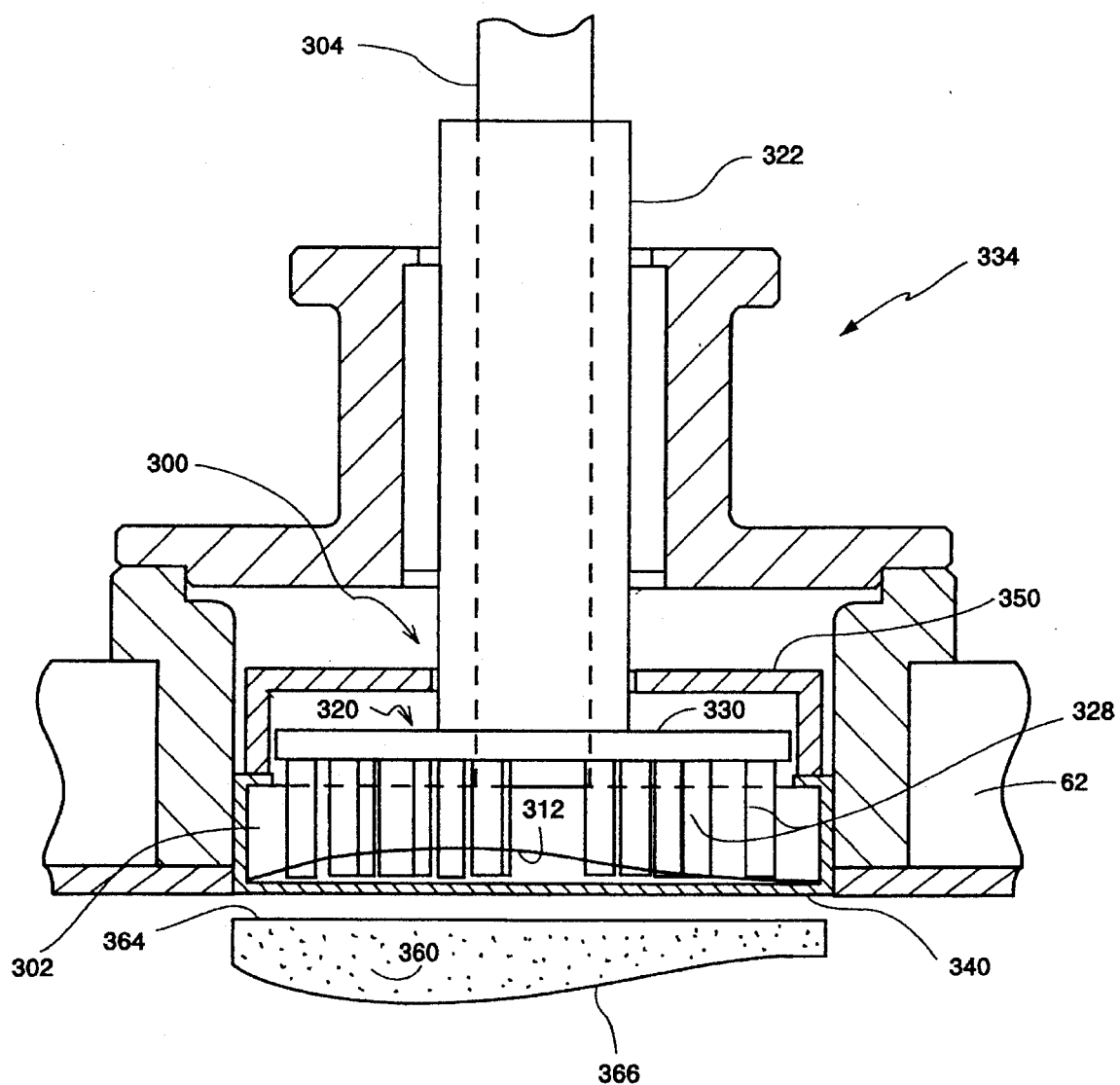
FIG. 14D is a cross-sectional view of the forming station of FIG. 14A ejecting the formed food product.

In the ejection of the food product from the forming cavity 336, as can be seen in FIG. 14D, the use of the above-described combination of elements results in a food product 360 having a virtual mirror image after being ejected from the forming cavity 336. That is, when formed and when still positioned against the piston face 312, the upper surface 364 of the food product 360 has a three-dimensional contour while the lower surface 366 thereof is substantially planar. However, as a result of the ejection from the forming cavity 336, at least part of the three-dimensional contour of the upper surface 364 is transferred to the lower surface. Preferably, this transfer is a substantially complete inversion of the three-dimensional contours from the upper surface 364 to the lower surface 366. In this case, with the upper surface 364 being substantially planar, the above-described separation system 286 may be utilized if desired. Moreover, the retention of the plurality of plungers 328 (the ends of which collectively define a planar surface) will assist the membrane 340 in maintaining its substantially planar condition of FIG. 14D. Consequently, the wire 294 of the separation system 286 would pass between the upper surface 364 of the food product 360 and the bottom portion 342 of the membrane 340 to assist in separating the food product 360 from the membrane 340. Accordingly, the present invention provides an apparatus and a process which allows the use of a separation system 286 to separate a three-dimensional, contoured food product 360 from a piston face 312.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such or other embodiments, and with various modifications required by the particular applications or uses of the present invention. It is intended that the appended claims be construed to include alternative embodiments to the extent permitted by the prior art.

What is claimed is:

1. An apparatus for forming a food product from a flowable, pumpable, raw food material, comprising:
   a forming cavity;
   a mold comprising a generally concave mold face, said mold comprising a piston reciprocally positioned within said forming cavity, said piston defining an entirety of said mold face;
   a membrane mounted directly on said piston, wherein at least a portion of said membrane is positioned over said mold face; and
   a raw food material supply assembly for directing a supply of the flowable, pumpable, raw food material toward said mold face, wherein said membrane substantially conforms to said mold face to form the food product and wherein said membrane assists in separating the food product from said mold face.

2. An apparatus, as claimed in claim 1, wherein:
   said forming cavity comprises a sidewall for substantially matingly receiving said piston, wherein said piston has a side portion and at least a portion of said membrane is positioned between said sidewall of said forming cavity and said side portion of said piston.

3. An apparatus, as claimed in claim 1, wherein:
   at least a portion of said mold face has a three-dimensional contour.

4. An apparatus, as claimed in claim 1, wherein:
   said piston further comprises a sidewall extending upwardly from said mold face and a piston top defining an upper surface of said piston; and
   said membrane comprises bottom, side, and lip portions, said bottom portion being positioned over said mold face, said side portion extending upwardly from said bottom portion and being positioned substantially adjacent said sidewall of said piston, and said lip portion extending inwardly from said side portion and against at least a portion of said piston top.

5. An apparatus, as claimed in claim 4, wherein:
   said sidewall of said piston defines a periphery of said mold, said entire sidewall of said piston is of substantially uniform height and said mold face has a generally concave, three-dimensional contour.

6. An apparatus, as claimed in claim 1, further comprising:
   a plunger assembly reciprocally interconnected with said piston, movable between at least first and second positions, and comprising a plurality of plungers, said plurality of plungers being substantially recessed within said piston when said plunger assembly is in said first position, said plurality of plungers extending through and being displaced outwardly from said mold face when said plunger assembly is in said second position.

7. An apparatus, as claimed in claim 1, further comprising:
   a support member having a plurality of forming stations positioned thereon, each said forming station comprising said mold and said membrane; and
   a moving assembly, interconnected with said support member, for aligning said forming stations with said raw food material supply assembly in a predetermined sequence.

8. An apparatus for forming a food product from a raw food material, comprising:
   a mold having a mold face;
   a plunger assembly associated with said mold, comprising a plurality of plungers, and movable between at least first and second positions, said plurality of plungers being substantially contained within said mold when said plunger assembly is in said first position, said plurality of plungers being extendable through and displaced outwardly from said mold face when said plunger assembly is in said second position;
   a moving assembly for moving said plunger assembly between said first and second positions; and
   a raw food material supply assembly for directing a supply of the raw food material toward said mold face to form the food product, said plunger assembly being in said first position as the food product is being formed and being moved by said moving assembly from said first position to said second position to at least assist in the ejection of the food product from said mold.

9. An apparatus, as claimed in claim 8, wherein:
   said mold further comprises a sidewall extending upwardly from said mold face and a mold top defining a top portion of said mold; and
   said plunger assembly further comprises a mounting plate, said mounting plate being positioned above said mold top and said plurality of plungers extending from said mounting plate through at least a portion of said mold.

10. An apparatus, as claimed in claim 9, further comprising:
   a mold cap connected to said mold and positioned above said mold top for substantially enclosing said mounting plate of said plunger assembly between said mold cap and said mold top.

11. An apparatus, as claimed in claim 8, wherein:
   said plurality of plungers are of substantially equal length.

12. An apparatus, as claimed in claim 8, wherein:
   said plunger assembly comprises a mounting plate, said plurality of plungers extending from said mounting plate and ends of said plurality of plungers collectively defining a substantially planar surface.

13. An apparatus, as claimed in claim 12, further comprising:
   a membrane mounted on said mold and positioned over said mold face, wherein the raw food material directed toward said mold face substantially conforms said membrane to said mold face; and
   a separator which passes between said membrane and the food product after said plunger assembly is in said second position with said ends of said plurality of plungers substantially maintaining said membrane as a planar surface.

14. A method for forming a three-dimensional food product having upper and lower surfaces utilizing a mold and a membrane, wherein at least a portion of a mold face of said mold has a three-dimensional contour and at least a portion of said membrane is positioned over said mold face, said method comprising the steps of:
   directing a flow of a raw food material toward said mold face;
   substantially conforming said membrane to said contour of said mold face with said directing step to form at least a portion of the upper surface of the food product with a three-dimensional contour;
   ejecting the food product from said mold using at least said membrane; and
   generating a three-dimensional contour on at least a portion of the lower surface of the food product using said ejecting step.

15. A method, as claimed in claim 14, wherein said generating step further comprises the step of:
   modifying at least a portion of the three-dimensional contour of the upper surface of the food product.

16. A method, as claimed in claim 14, wherein:
   prior to said generating step the lower surface of the food product is substantially planar, and wherein said generating step comprises substantially inverting the contours of the upper and lower surfaces of the food product.

17. A method, as claimed in claim 14, wherein said ejecting step further comprises the steps of:
   providing a plunger assembly comprising a plurality of plungers;
   retaining said plurality of plungers within said mold and recessed relative to said mold face; and
   advancing said plurality of plungers through said mold face to a position displaced outwardly from said mold face to force said membrane away from said mold face.

18. A method, as claimed in claim 17, wherein:
   ends of said plurality of plungers collectively define a substantially planar surface after said advancing said plurality of plungers step, said method further comprising the step of:
   advancing a separator between the upper surface of the food product and said membrane to separate the food product from said membrane.

19. An apparatus for forming a food product from a raw food material, comprising:
   a mold comprising a mold face, a sidewall extending upwardly from said mold face, and a mold top defining an upper surface of said mold;
   a membrane mounted directly on at least a portion of said mold, wherein at least a portion of said membrane is positioned over said mold face, said membrane comprising bottom, side and lip portions, said bottom portion being positioned over said mold face, said side portion extending upwardly from said bottom portion and being positioned substantially adjacent said sidewall of said mold, and said lip portion extending inwardly from said side portion and against at least a portion of said mold top; and
   a raw food material supply assembly for directing a supply of the raw food material toward said mold face, wherein said membrane substantially conforms to said mold face to form the food product, and wherein said membrane assists in separating the food product from said mold face.

20. An apparatus, as claimed in claim 19, wherein:
   said sidewall of said mold defines a periphery of said mold, wherein said entire sidewall of said mold is of substantially uniform height, and wherein said mold face has a generally concave, three-dimensional contour.

21. An apparatus for forming a food product from a raw food material, comprising:
   a mold having a mold face;
   a membrane mounted directly on at least a portion of said mold, wherein at least a portion of said membrane is positioned over said mold face;
   a raw food material supply assembly for directing a supply of raw food material toward said mold face, wherein said membrane substantially conforms to said mold face to form the food product and wherein said membrane assists in separating the food product from said mold face; and
   a plunger assembly reciprocally interconnected with said mold, movable between at least first and second positions, and comprising a plurality of plungers, said plurality of plungers being substantially recessed within said mold when said plunger assembly is in said first position, said plurality of plungers extending through ad being displaced outwardly from said mold face when said plunger assembly is in said second position.

* * * * *